United States Patent
Cho et al.

(10) Patent No.: US 9,798,005 B2
(45) Date of Patent: Oct. 24, 2017

(54) THREE-DIMENSIONAL SPACE MEASUREMENT DEVICE AND METHOD FOR OPERATING SAME

(71) Applicant: LG ELECTRONICS INC., Seoul (KR)

(72) Inventors: Sungjin Cho, Seoul (KR); Jeonguk Lee, Seoul (KR); Gyeongeon Lee, Seoul (KR); Soowhan Jeoung, Seoul (KR); Hyerim Kim, Seoul (KR); Sunghoon Cha, Seoul (KR); Jejong Lee, Seoul (KR); Hyunseok Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 121 days.

(21) Appl. No.: 14/655,823

(22) PCT Filed: Dec. 26, 2013

(86) PCT No.: PCT/KR2013/012229
§ 371 (c)(1),
(2) Date: Jun. 26, 2015

(87) PCT Pub. No.: WO2014/104765
PCT Pub. Date: Jul. 3, 2014

(65) Prior Publication Data
US 2015/0346343 A1 Dec. 3, 2015

(30) Foreign Application Priority Data
Dec. 28, 2012 (KR) .................. 10-2012-0157122

(51) Int. Cl.
*G01S 17/46* (2006.01)
*G01S 7/481* (2006.01)
(Continued)

(52) U.S. Cl.
CPC ............... *G01S 17/46* (2013.01); *G01C 3/08* (2013.01); *G01S 7/4817* (2013.01); *G01S 17/48* (2013.01)

(58) Field of Classification Search
CPC ...................................... G01C 3/08
See application file for complete search history.

(56) References Cited

U.S. PATENT DOCUMENTS

| 6,034,803 A | 3/2000 | Sullivan et al. |
| 2006/0050263 A1* | 3/2006 | Mizuo .................. G01C 3/08 356/5.01 |

(Continued)

FOREIGN PATENT DOCUMENTS

| KR | 10-1993-7001726 A | 6/1993 |
| KR | 10-2006-0030068 A | 4/2006 |

(Continued)

OTHER PUBLICATIONS

International Search Report dated Apr. 16, 2014 issued in Application No. PCT/KR2013/012229.

*Primary Examiner* — Luke Ratcliffe
(74) *Attorney, Agent, or Firm* — KED & Associates, LLP

(57) ABSTRACT

In the present disclosure, a structure of a 3-dimensional space measurement device is maximally simplified to be easily carriable by a user to measure a 3-dimensional spatial data. For simplifying the structure, a light transmission unit and a light reception unit are fixed to a support plate, and the support plate is fixed to a rotation unit. Provided are a 3-dimensional space measurement device capable of adjusting a rotation angle of the rotation unit and a tilt angle of the support plate to efficiently measure a distance and space, and a measurement method of a distance and space for making 3-dimensional spatial data.

10 Claims, 18 Drawing Sheets

(51) Int. Cl.
*G01C 3/08* (2006.01)
*G01S 17/48* (2006.01)

(56) References Cited

U.S. PATENT DOCUMENTS

| | | | | |
|---|---|---|---|---|
| 2010/0030380 A1* | 2/2010 | Shah | ................. | G01S 7/4813 |
| | | | | 700/258 |
| 2010/0110413 A1* | 5/2010 | Liu | ................. | E03C 1/057 |
| | | | | 356/4.01 |
| 2010/0208232 A1* | 8/2010 | Hara | ................. | G01B 11/002 |
| | | | | 356/4.09 |

FOREIGN PATENT DOCUMENTS

| | | | |
|---|---|---|---|
| KR | 10-0882737 | B1 | 2/2009 |
| KR | 10-1193789 | B1 | 10/2012 |

* cited by examiner

THREE-DIMENSIONAL SPACE MEASUREMENT DEVICE AND METHOD FOR OPERATING SAME

CROSS-REFERENCE TO RELATED PATENT APPLICATIONS

This application is a U.S. National Stage Application under 35 U.S.C. §371 of PCT Application No. PCT/KR2013/012229, filed Dec. 26, 2013, which claims priority to Korean Patent Application No. 10-2012-0157122, filed Dec. 28, 2012 whose entire disclosures are hereby incorporated by reference.

TECHNICAL FIELD

The present disclosure relates to a 3-dimensional (3D) space measurement device and a method for operating same, and more particularly, to a 3D space measurement device measuring a distance between the 3D space measurement device and a surrounding object while moving a measurement position through rotation and tilt driving during operation of a 3D space measurement device, and measuring a space based on the measured distance and a method for operating same.

BACKGROUND ART

A 3D space measurement device (hereinafter referred to as 'scanner') of the present disclosure measures a distance between a scanner and a surrounding object by using light. Methods of measuring a distance by using light include a triangulation method and a time of flight (TOF) method. The triangulation method is a method of measuring a distance based on triangulation, and the TOF method is a method of calculating a distance between a distance measurement device and a surrounding object by using a difference between a time when the distance measurement device emits light and a time when the emitted light is reflected by the surrounding object and returns to the distance measurement device.

In the present disclosure, a distance between a scanner and a surrounding object is calculated by using the triangulation method. In addition, the present disclosure provides a scanner moving a distance measurement position in vertical and horizontal directions to measure a distance by using rotation and tilt driving during an operation of the scanner and making spatial data based on the measured distance, and a method of measuring a distance and space.

DISCLOSURE OF THE INVENTION

Technical Problem

Embodiments provide a scanner of which a structure is configured as simply as possible by using a rotation driving unit and a tilt driving unit and a method of measuring a distance and space for making spatial data.

Technical Solution

In one embodiment, a distance measurement device includes a light transmission unit emitting a distance measurement beam to a measurement position; a light reception unit measuring a position of a light reflected at the measurement position and collected at the distance measurement device; a support plate to which the light transmission unit and the light reception unit are fixed; a tilt driving unit adjusting a slope of the support plate; a rotation unit to which the support plate is fixed; a rotation driving unit adjusting rotation of the rotation unit; and a distance calculation unit calculating a distance between the distance measurement device and the measurement position on a basis of a value of the measured position.

In another embodiment, a distance measurement device includes: a first light transmission unit emitting a distance measurement beam to a surrounding object; a second light transmission unit emitting a distance measurement beam to the surrounding object; a light reception unit measuring a position of a light reflected by the surrounding object and collected at the distance measurement device; a central controller emitting a second distance measurement beam to the surrounding object by using the second light transmission unit when the light reception unit does not measure the position of the light collected at the distance measurement device; a support plate to which the first light transmission unit, the second light transmission unit, and the light reception unit are fixed; a tilt driving unit adjusting a slope of the support plate; a rotation unit to which the support plate is fixed; a rotation driving unit adjusting rotation of the rotation unit; and a distance calculation unit calculating the distance between the distance measurement device and the measurement position on a basis of the value of the measured position.

In further another embodiment, a method of operating a distance measurement device, the method includes: emitting a distance measurement beam to a measurement position; measuring a position at which a light reflected at the measurement position and returned to the distance measurement device is focused and which is on a light reception sensor; calculating a distance between the distance measurement device and the measurement position on a basis of the measured position; and adjusting a slope angle of a support plate and a rotation angle of a rotation unit to move the measurement position and measuring a distance between the distance measurement device and the measurement position.

Advantageous Effects

According to an embodiment, a user easily carries a scanner by simplifying a structure of the scanner and a manufacturing cost of the scanner can be reduced. In addition, a space can be precisely measured by using the scanner.

MODE FOR CARRYING OUT THE INVENTION

Reference will now be made in detail to a scanner related to the embodiments of the present disclosure, examples of which are illustrated in the accompanying drawings. Those skilled in the art may easily understand that a configuration according to an embodiment described herein may be applied to various devices. For example, a robot recognizing surrounding objects to determine a moving path, a device for detecting a minute operation occurring in the periphery or surrounding objects, a device for recognizing a user operation, and a device for creating 3D image may be included.

Hereinafter, description will be provided about a basic operation method of a distance measurement using a triangulation method with reference to FIG. 1.

Figure 1:
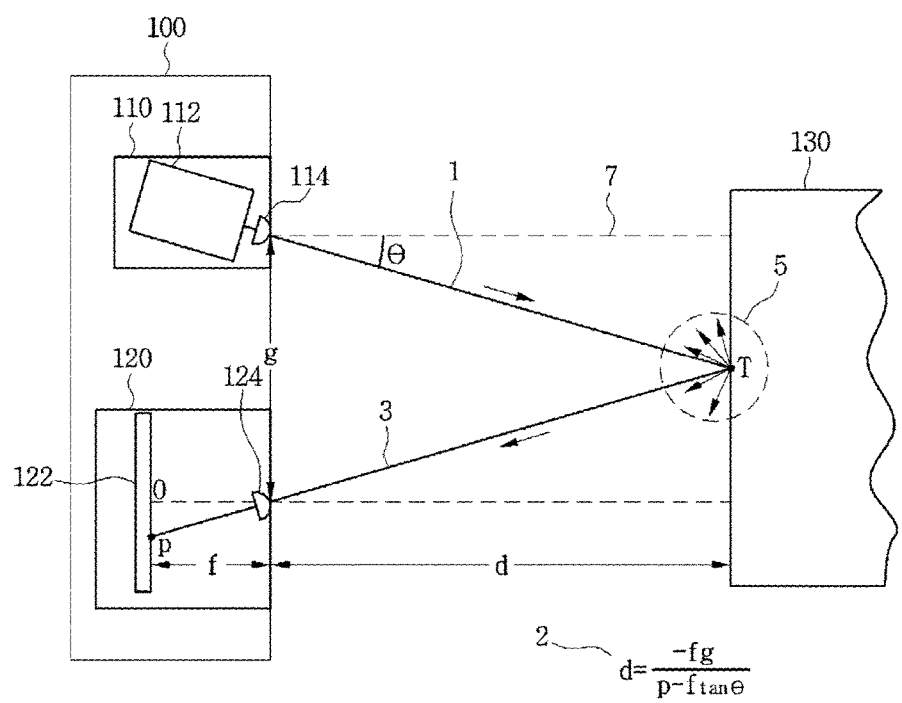
FIG. 1 illustrates a basic operation method of a scanner using a triangulation method.

FIG. 1 is a block diagram illustrating a basic operation method of a scanner by using a triangulation method.

The scanner 100 includes a light transmission unit 110 and a light reception unit 120.

Hereinafter, the elements will be sequentially described.

The light transmission unit 110 includes a light source 112 emitting a distance measurement beam 1. In addition, a light source lens 114 may also be included.

The light reception unit 120 includes a light reception lens 124 collecting light 3 that the distance measurement beam 1 is reflected by a surrounding object 130 and returned to a light reception sensor 122. The light reception sensor 122 senses a position at which the light 3 reflected and returned is collected.

As illustrated in FIG. 1, the light transmission unit 110 emits the distance measurement beam 1 toward the surrounding object 130. When arriving at the surrounding object 130, the distance measurement beam 1 is reflected by the surface T of the surrounding object to have a type of light 5 reflected in various parts. Some 3 of the light reflected in various parts are collected by the light reception lens 124 included in the scanner 100 to the light reception sensor 122 of the light reception unit 120.

A distance between the scanner 100 and the surrounding object 130 is defined as d, a distance between the light source lens 114 and the light reception lens 124 is defined as g, and a focal length of the light reception lens 124 is defined as f. In addition, an angle that the light source 112 is tilted with respect to the horizontal line 7 is defined as θ, and a position at which the light collected at the light reception sensor 122 is defined as p. A light position value of p is determined by taking the center of the light reception sensor 122 as "0". In this case, the distance d between the scanner 100 and the surrounding object 130 may be calculated by using an equation 2. In a scanner 100 in which an f value, g value, and θ value are determined, the distance d between the scanner 100 and surrounding object 130 may be obtained by detecting a light position value p with the light reception sensor 122. Equation (2) may be applied to all embodiments described below.

Figure 2A:
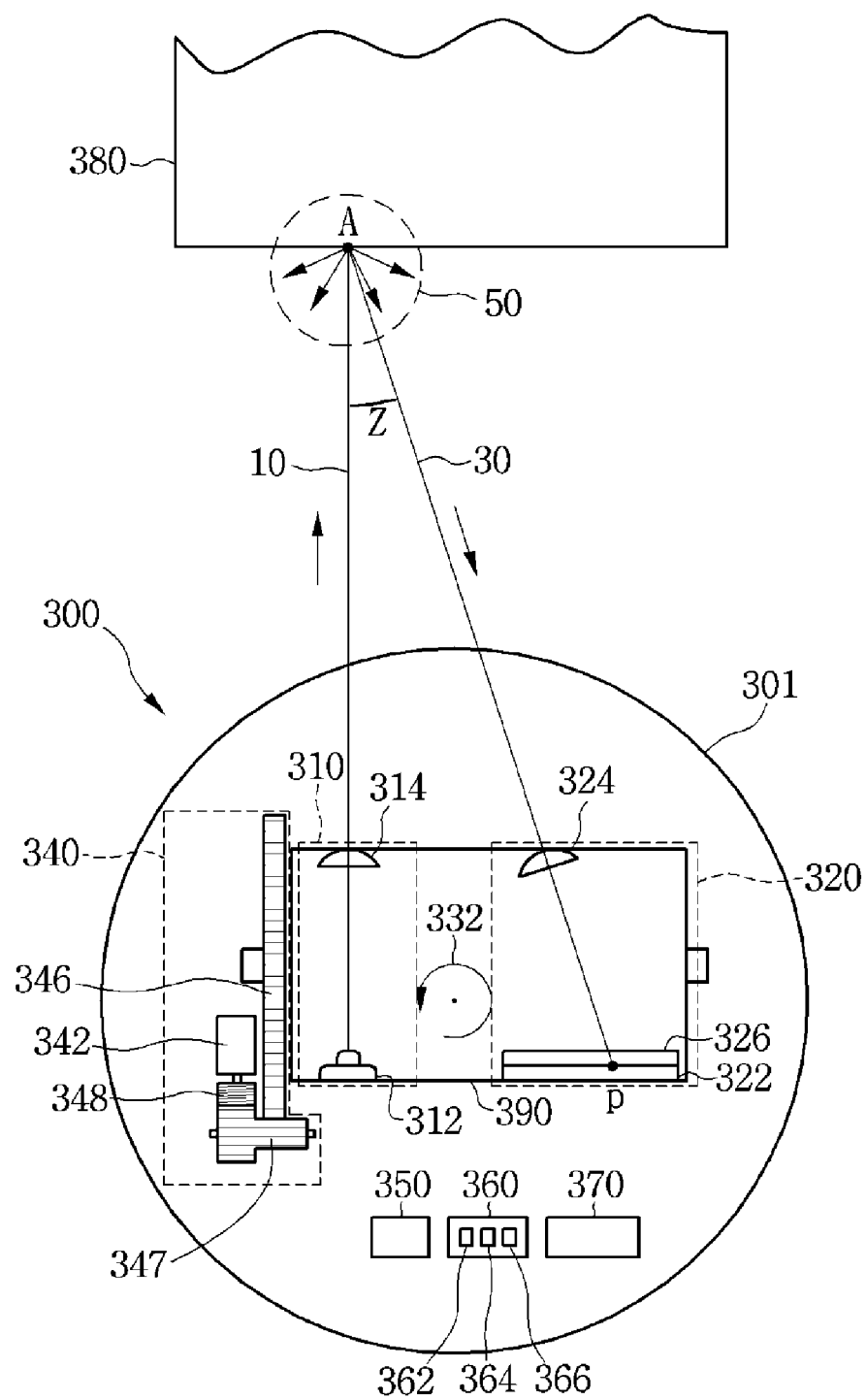
FIGS. 2a and 2b illustrate an operation method of a scanner according to an embodiment.
Figure 2B:
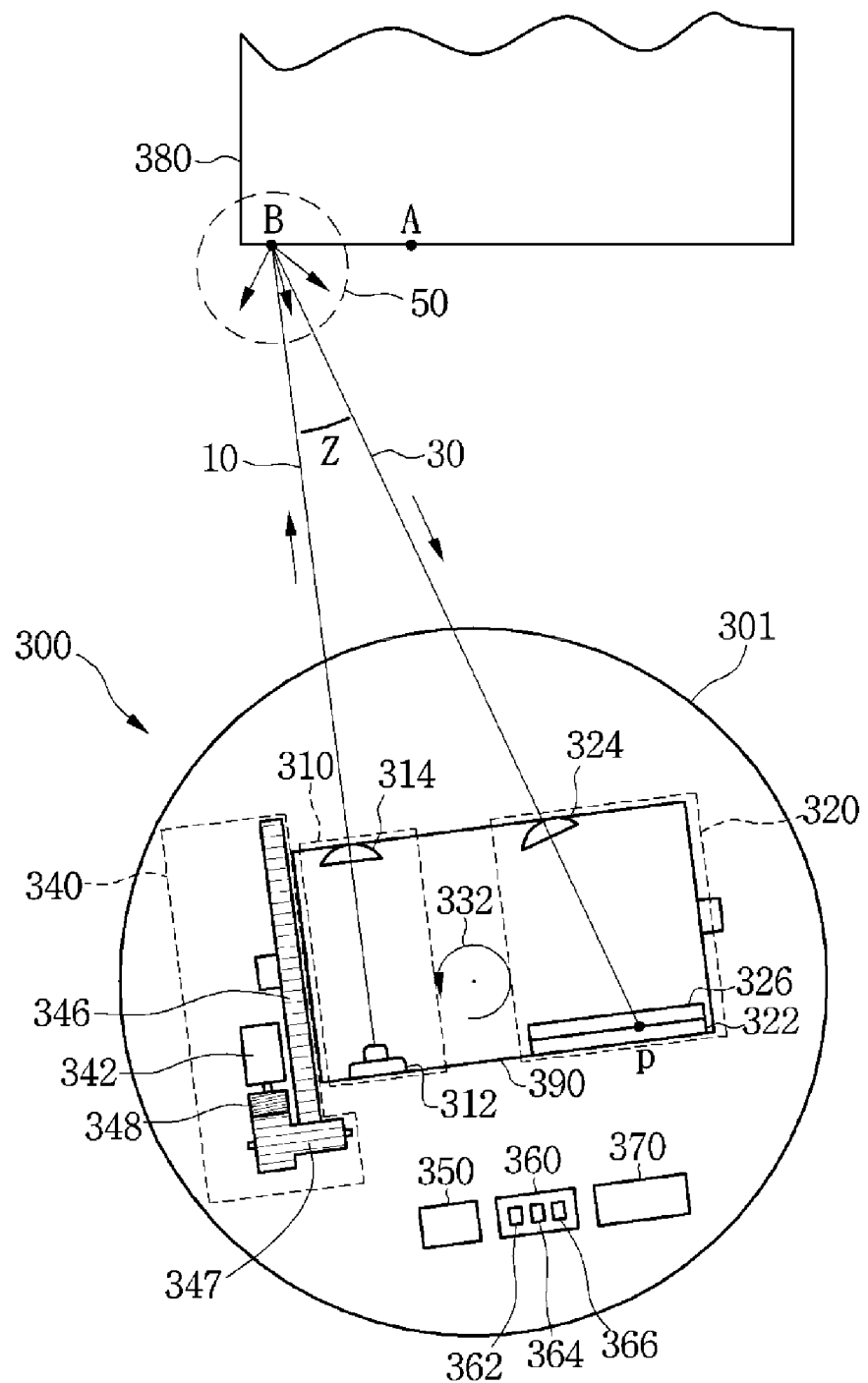

FIGS. 2a and 2b are block diagrams illustrating a basic operation method of a scanner according to an embodiment.

The scanner 300 may include a light transmission unit 310, a light reception unit 320, a rotation driving unit 330, a tilt driving unit 340, a communication unit 350, a central controller 360, and a power supplying unit 370.

The light transmission unit 310 and the light reception unit 320 may be fixed on an identical surface of the support plate 390. The light transmission unit 310 may include the light source 312 and the light source lens 314. As the light source 312, a laser diode (LD) and a light emitting diode (LED) may be used, and the light source lens 314 may employ a collimator lens to make light emitted from the light source 312 into parallel light or convergent light.

The light reception unit 320 may include a light reception sensor 322, a light reception lens 324, and a wavelength filter 326. The light reception lens 324 collects light to the light reception sensor 322 and the light reception sensor 322 senses a position of the light collected by the light reception lens 324. The wavelength filter 326 prevents light having a different wavelength from the light emitted from the light source 312 from being sensed by the light reception sensor 322.

The distance measurement beam 10 emitted from the light source 312 and a part of light 30 reflected by the surrounding object 380 to be collected at the light reception lens 324 make an angle Z. The light resource lens 314 and the light reception lens 324 may be configured to have the angle Z of about 0 to 20 degrees. However, the angle Z may be an angle of about 20 degrees or greater according to a configuration of the light source lens 314 and the light reception lens 324.

The support plate 390 to which the light transmission unit 310 and the light reception unit 320 are fixed is fixed to the rotation unit 301. In addition, the tilt driving unit 340 may also be fixed to the rotation unit 301.

The rotation driving unit 330 may be configured to be horizontally rotatable. For example, the rotation driving unit 330 may adjust rotation of the rotation unit 301 by using a rotation driving motor 336, a first rotation driving gear 338, and a second rotation driving gear 339. In addition, when the rotation driving unit 300 horizontally rotates the rotation unit 301, a support plate 390 fixed to the rotation unit 301 rotates in the horizontal direction identically to the rotation unit 301. While FIG. 2a illustrates that the rotation driving unit 330 rotates the rotation unit 301 in the counterclockwise direction 332, the rotation driving unit 330 may also rotate the rotation unit 301 in the clockwise direction. The rotation driving unit 330 may include an encoder, and the encoder may transmit rotation angle information as an encoder signal to a spatial information operation unit 366.

The tilt driving unit 340 is configurable to adjust a slope of the support plate 390. For example, the tilt driving unit 340 may adjust a slope of the support plate 390 by using a tilt driving motor 342, a first tilt driving gear 346, a second tilt driving gear 347, and a third tilt driving gear 348. The tilt driving motor 342 rotates the tilt driving gears 36, 347, and 348 to vertically adjust the slope of the support plate 390. When the slope of the support plate 390 is vertically adjusted, the slopes of the light transmission unit 310 and the light reception unit 320 fixed to the support plate 390 is adjusted in the identical direction. The tilt driving unit 340 may include an encoder, and the encoder may transmit rotation angle information as an encoder signal to the spatial information operation unit 366.

The central controller 360 may be located at the support plate 390 or the rotation unit 301. The central controller 360 may include a distance calculation unit 362, a rotation and tilt controller 364, and a spatial information operation unit 366. The distance calculation unit 362 calculates a distance between the scanner 300 and the measurement position on the basis of a light position value p transmitted from the light reception sensor 322. The rotation and tilt controller 364 controls the rotation driving unit 330 and the tilt driving unit 340. The spatial information operation unit 366 performs coordinate calculation and makes spatial information data on the basis of the distance calculated by the distance calculation unit 362 and a rotation angle and tilt angle (a slope angle) respectively transmitted from the rotation driving unit 330 and tilt driving unit 340. When the rotation driving unit 330 and tilt driving unit 340 transmit the rotation angle and tilt angle information through the encoder signal, the spatial information operation unit 366 may calculate the rotation angle and tilt angle from the encoder signal. In addition, the central controller 360 controls the entire operation of the scanner 300. The central controller 360 may transmit the spatial data made by the spatial information operation unit 366 to an external device through the communication unit 350 in a wireless/wired manner.

The power supplying unit 370 receives external and internal power under a control of the central controller 360 and supplies power necessary for operating each element.

Since the elements illustrated in FIGS. 2a and 2b are not essential, a scanner including more or less elements than those may be implemented.

FIG. 2a illustrates that a distance between the scanner 300 and surrounding object 380 is measured by using the distance measurement beam 10.

The central controller 360 enables the light source 312 to emit the distance measurement beam 10 to the surrounding object 380. The distance measurement beam 10 arrives at the surrounding object 380. When arriving at the surrounding object 380, the distance measurement beam 10 is reflected by the surface A of the surrounding object 380 to have a type 50 of light reflected in various parts. Some 30 of the light reflected in various parts are collected by the light reception lens 324 included in the scanner 300 to the light reception sensor 322 of the light reception unit 320. The light reception sensor 322 transmits the position value p of the light focused at the light reception sensor 322 to the distance calculation unit 362. At this point, for detecting the precise value of p, the wavelength filter 326 may be disposed between the light reception lens 324 and the light reception sensor 322. The wavelength filter 326 passes light having the same wavelength as that emitted from the light source 312 to prevent other external light from being sensed. The light reception sensor 322 may transmit the p value in a digital or analog signal to the distance calculation unit 362.

The distance calculation unit 362 of the central controller 360 may calculate the distance between the surface A of the surrounding object and the scanner 300 by using the triangulation method described in relation to FIG. 1 on the basis of the light position value p received from the light reception sensor 322.

FIG. 2b illustrates a view that the rotation unit 301 horizontally rotates at a certain angle. The rotation and tilt controller 364 of the central controller 360 may drive the rotation driving unit 330 to horizontally rotate the rotation unit 301 as illustrated in FIG. 2b.

The central controller 360 enables the light source 312 to emit the distance measurement beam 10 to the surrounding object 380. The distance measurement beam 10 arrives at the surrounding object 380. When arriving at the surrounding object 380, the distance measurement beam 10 is reflected by the surface B of the surrounding object 380 to have a type 50 of the light reflected in various parts. Some 30 of the light reflected in various parts are collected by the light reception lens 324 included in the scanner 300 to the light reception sensor 322 of the light reception unit 320. The light reception sensor 322 transmits the position value p of the light collected at the light reception sensor 322 to the distance calculation unit 362. At this point, for detecting the precise p value, the wavelength filter 326 may be disposed between the light reception lens 324 and the light reception sensor 322. The wavelength filter 326 passes light having the same wavelength as that emitted from the light source 312 to prevent other external light from being sensed.

The distance calculation unit 362 of the central controller 360 may calculate the distance between the surface B of the surrounding object and the scanner 300 by using the triangulation method described in relation to FIG. 1 on the basis of the light position value p received from the light reception sensor 322.

When the rotation plate 301 horizontally rotates, the measurement position of the scanner 300 is also moved in the horizontal direction. FIG. 2b illustrates that when the scanner rotates the rotation unit 301 in the counterclockwise direction, the measurement position is moved to the left. As describe above, the scanner 300 may rotate the rotation plate 301 in the clockwise direction. In this case, the measurement position is moved to the right.

Figure 3:
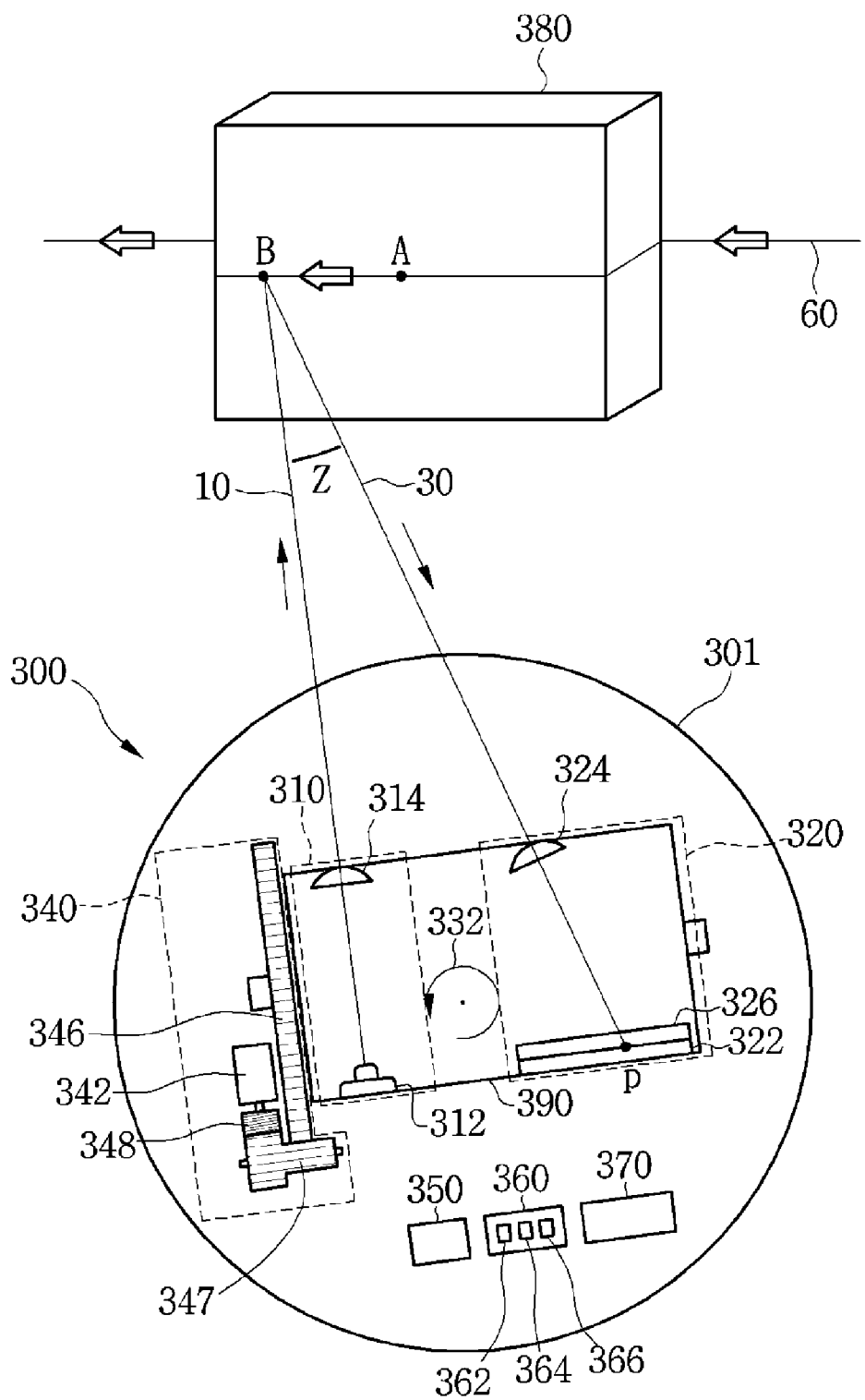
FIG. 3 illustrates an operation method of a rotation driving unit of a scanner according to an embodiment.

FIG. 3 illustrates contents of FIGS. 2a and 2b together. FIG. 3 illustrates when the scanner 300 measures the distance between the scanner 300 and the surrounding object 380 while rotating the fixed rotation unit 301. to which the light transmission unit 310 and the light reception unit 320 are fixed. As described above, the central controller 360 of the scanner 300 may drive the rotation driving unit 330 by using the rotation and tilt controller 364 to horizontally rotate the rotation unit 301 in the counterclockwise direction 332. Every time the rotation unit 301 rotates at the certain angle, the central controller 360 may obtain the distance between the scanner 300 and the surrounding object 380. FIG. 2a illustrates that the distance between the scanner 300 and the surface A of the surrounding object is measured, and FIG. 2b illustrate that the distance between the scanner 300 and the surface B of the surrounding object is measured according to rotation of the rotation unit 301. FIG. 3 illustrates that the distance between the scanner 300 and the surrounding object is measured while a distance measurement position on a first horizontal line 60 is horizontally moved according to rotation of the rotation unit 301.

Figure 4A:
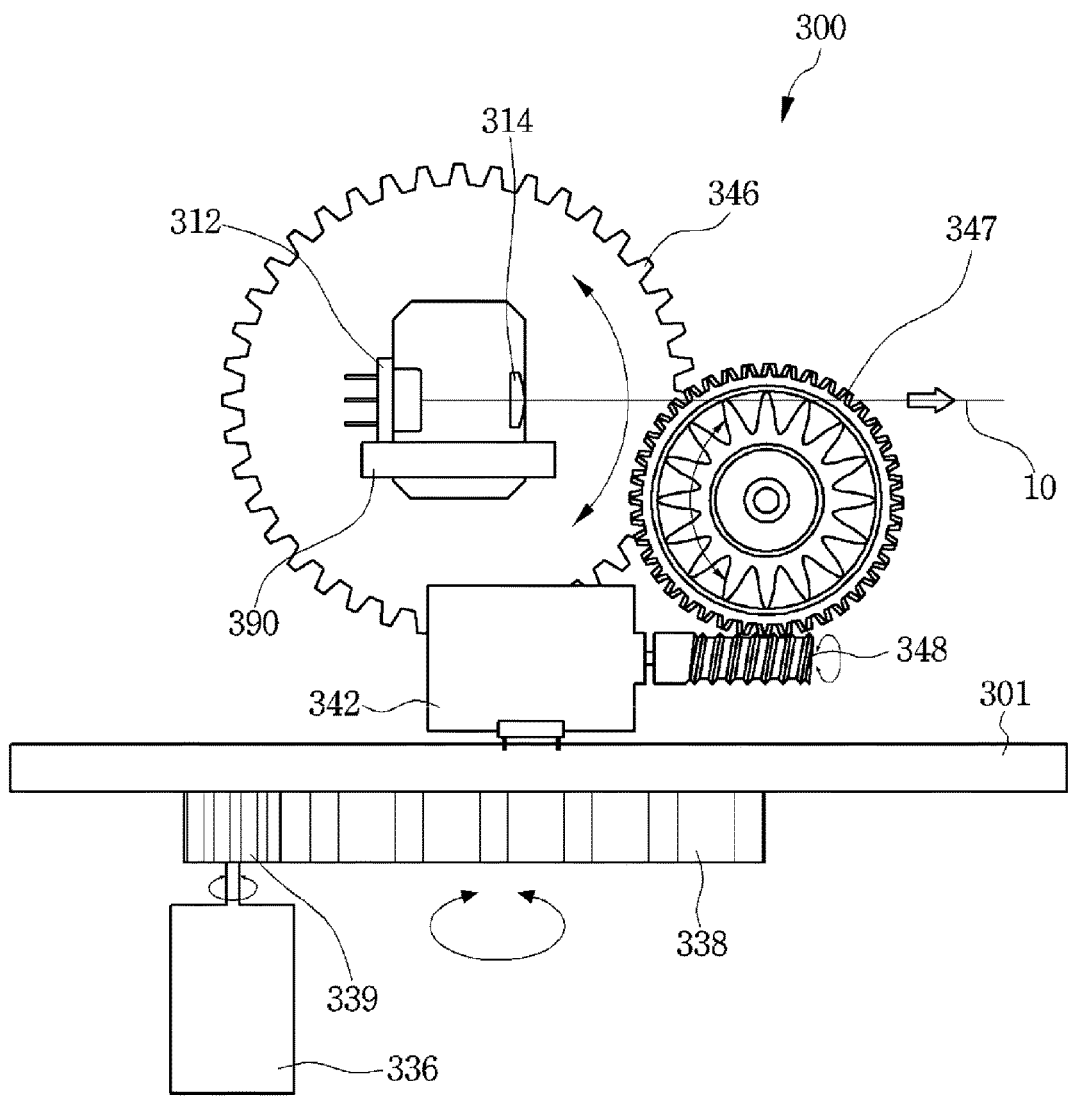
FIGS. 4a and 4b respectively illustrate examples of a tilt driving unit and a rotation driving unit used for an embodiment.

FIG. 4a illustrates an exemplary plan view of the rotation driving unit 330 and the tilt driving unit 340 of the scanner 300. The light reception unit 320 is not illustrated to represent the rotation unit 330 and the tilt driving unit 340 well in the drawing. The tilt driving unit 340 may be variously configurable to adjust the slope of the support plate 390. As described above, the tilt driving unit 340 may include a tilt motor 342 and the above-described tilt driving gears 346, 347, and 348.

The first tilt driving gear 346 is fixed on a side surface of the support plate 390. The third tilt driving gear 348 is coupled to the tilt motor 342. The second tilt driving gear 347 is engaged between the first and third tilt driving gears 346 and 348. When rotating, the tilt motor 342 rotates the third tilt driving gear 348 and the third tilt driving gear 348 rotates the second tilt driving gear 347. When the second tilt driving gear 347 rotates, the first tilt driving gear 346 rotates. The slope of the support plate 390 becomes differed according to rotation of the first tilt driving gear 346.

FIG. 4a illustrates that the above-described tilt driving gears 346, 347, and 348 are rotated by using the tilt driving motor 342 to vertically adjust the slope of the support plate 390 to which the light transmission unit 310 and the light reception unit 320 are fixed. When the slope of the support plate 390 is adjusted, the slopes of the light transmission unit 310 and the light reception unit 320 may be adjusted together. When the rotation and tilt controller 364 of the central controller 360 controls the tilt driving unit 340 to adjust the slope of the support plate 390 to which the light transmission unit 310 and the light reception unit 320 are fixed, the scanner 300 may vertically adjust the distance measurement position to measure the distance between the scanner 300 and the surrounding object 380.

The rotation driving unit 330 may be variously configured to horizontally rotate the rotation unit 301. For example, the rotation driving unit 330 may adjust rotation of the rotation unit 301 by using the rotation driving motor 336, the first rotation driving gear 338, and the second rotation driving gear 339.

The first rotation driving gear 338 is fixed at the center of the bottom surface of the rotation unit 301 and the second rotation driving gear 339 is coupled to the rotation driving motor 336. The first and second rotation driving gear 338 and 339 are engaged to rotate.

Therefore, when the rotation driving motor 336 rotates, the second rotation driving gear 339 coupled to the rotation driving motor 336 rotates together and the first rotation driving gear 338 coupled to the second rotation driving gear 338 rotates together. In addition, when the first rotation gear 338 rotates, the rotation unit 301 rotates together.

FIG. 4a illustrates that the rotation driving gears 338 and 339 are rotated by using the rotation driving motor 336 to horizontally rotate the rotation unit 301 to which the support plate 390 and the tilt rotation unit 340 are fixed.

When the rotation unit 301 is rotated, the light transmission unit 310 and the light reception unit 320 also rotate in an identical direction. When the rotation and tilt controller 364 of the central controller 360 controls the tilt driving unit 330 to rotate the support plate 390 to which the light transmission unit 310 and the light reception unit 320 are fixed, the scanner 300 may vertically adjust the distance measurement position to measure the distance between the scanner 300 and the surrounding object 380.

Figure 4B:
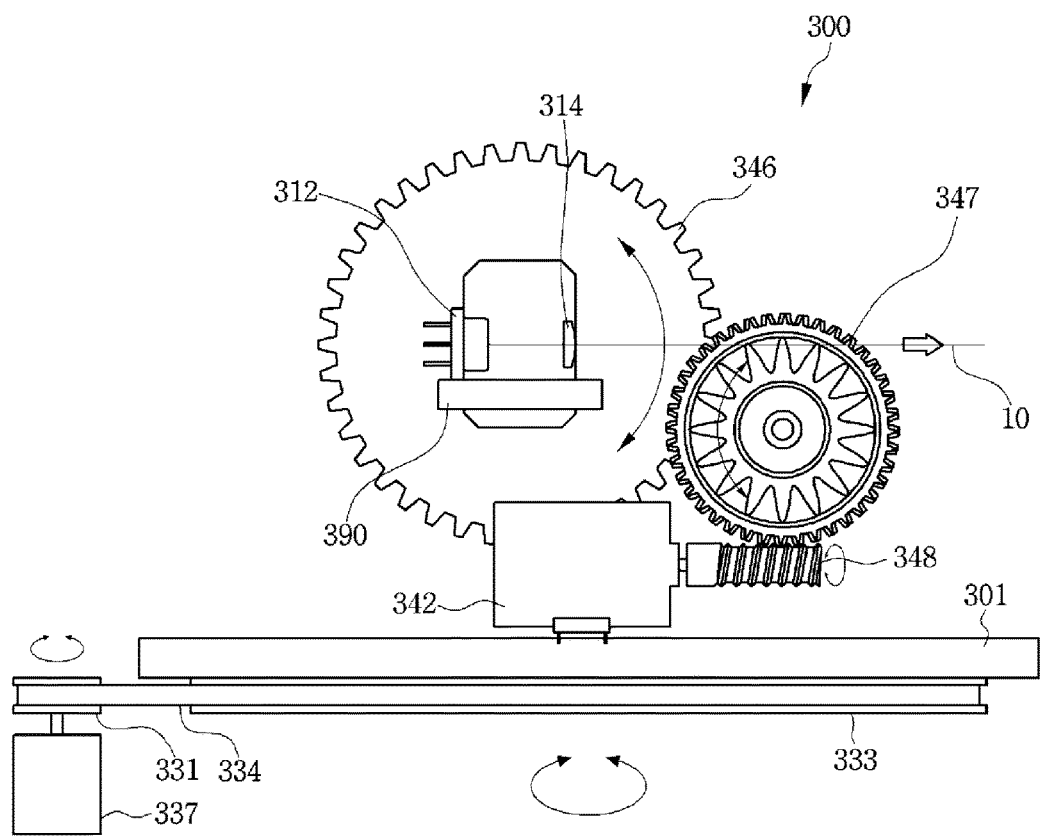

FIG. 4b illustrates an exemplary plan view of the rotation driving unit 330 and the tilt driving unit 340 of the scanner 300. The light reception unit 320 is not illustrated to represent the rotation unit 330 and the tilt driving unit 340 well in the drawing. The tilt driving unit 340 may be variously configurable to adjust the slope of the support plate 390.

The tilt driving unit 340 of FIG. 4b operates identically to the description in relation to FIG. 4a. However, the rotation driving unit 330 of FIG. 4b is configured differently.

The rotation driving unit 330 of FIG. 4b may adjust the rotation of the rotation unit 301 by using a pulley driving motor 337, a first pulley 333, a second pulley 331, and a pulley belt 334.

The first pulley 333 is fixed at the center of the bottom surface of the rotation unit 301 and the second pulley 331 is coupled to the pulley driving motor 337. The first pulley 333 and the second pulley 331 are coupled to the pulley belt 334 and rotate.

Therefore, when the pulley driving motor 337 rotates, the second pulley 331 coupled to the pulley driving motor 337 rotates together and the first pulley 338 coupled to the second pulley 331 rotates together. In addition, when the first pulley 333 rotates, the rotation unit 301 rotates together.

FIG. 4b illustrates that the pulleys 331 and 333 are rotated by using the pulley driving motor 337 to horizontally rotate the rotation unit 301 to which the support plate 390 and the tilt rotation unit 340 are fixed.

When the rotation unit 301 is rotated, the light transmission unit 310 and the light reception unit 320 also rotate in an identical direction. When the rotation and tilt controller 364 of the central controller 360 controls the tilt driving unit 330 to rotate the support plate 390 to which the light transmission unit 310 and the light reception unit 320 are fixed, the scanner 300 may horizontally adjust the distance measurement position to measure the distance between the scanner 300 and the surrounding object 380.

Figure 5:
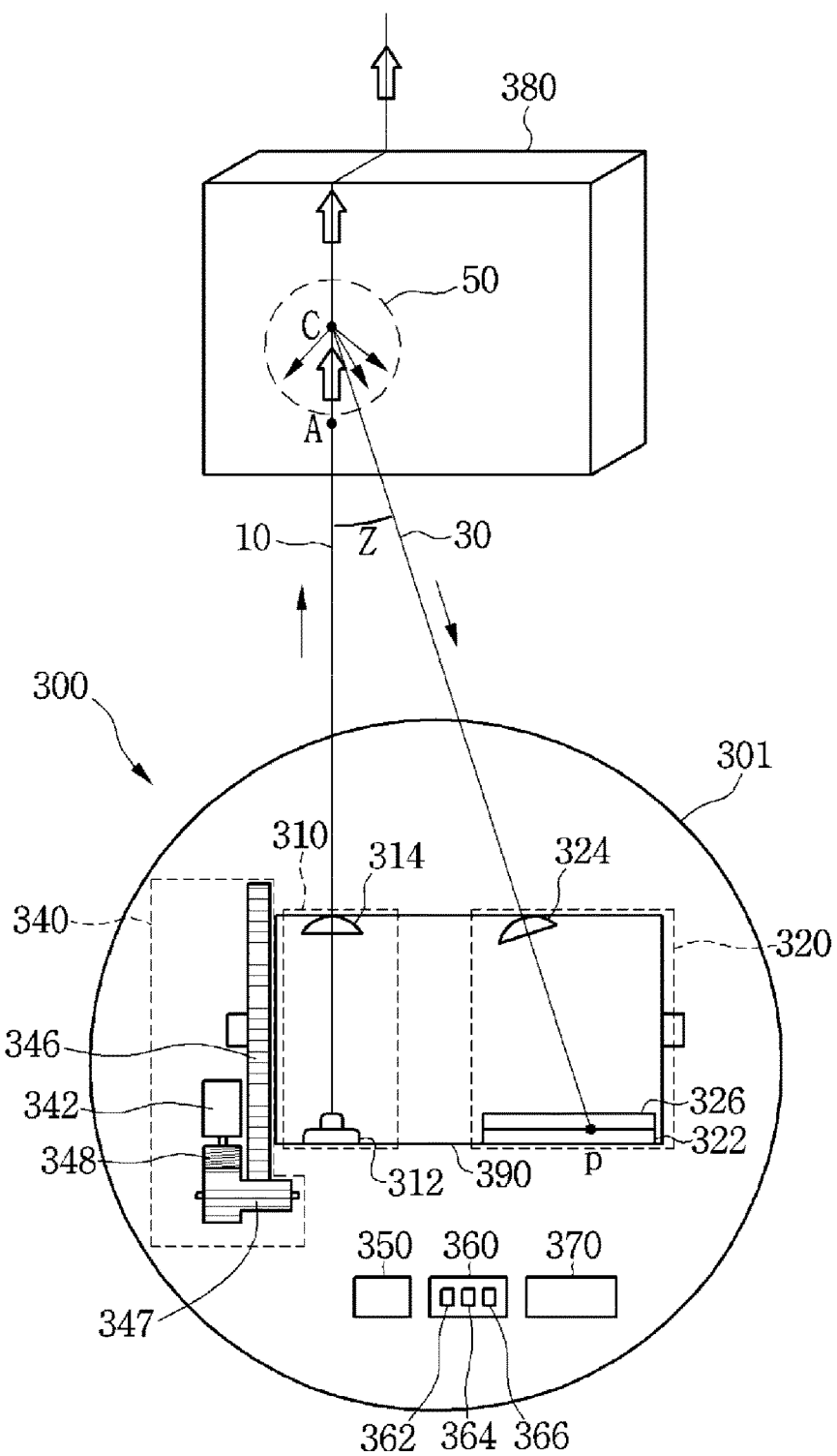
FIG. 5 illustrates an operation method of a tilt driving unit of a scanner according to an embodiment.

FIG. 5 illustrates that the scanner 300 vertically moves the measurement position to measure the distance between the scanner 300 and the surrounding object 380. The rotation and tilt controller 364 of the central controller 360 may drive the tilt driving unit 340 to adjust the slope of the support plate 390 to which the light transmission unit 310 and the light reception unit 320 are fixed. Since the slope of the support plate 390 is vertically adjusted, the scanner 300 may measure the distance between the scanner 300 and the surrounding object 380 while vertically moving the measurement position. For example, FIG. 5 illustrates that the rotation and tilt controller 364 measures the distance between the scanner 300 and the surrounding object 380 while controlling the tilt driving unit 340 and adjusting in the upward direction of the surrounding object 380 the slope of the support plate 390 to which the light transmission unit 310 and the light reception unit 320 are fixed.

FIG. 5 illustrates that the scanner 300 firstly measures the distance between the scanner 300 and the surface A of the surrounding object 380. The detailed description is identical to that in relation to FIG. 2a.

The scanner 300 measures the distance between the scanner 300 and the surface A of the surrounding object and drives the tilt driving unit 340 by using the rotation and tilt controller 364 of the central controller 360. The tilt driving unit 340 adjusts in the upward direction of the surrounding object 380 the slope of the support plate 390 to which the light transmission unit 310 and the light reception unit 320 are fixed and enables the light source 314 of the light transmission unit 310 to emit the light to the surface C of the surrounding object 380. The central controller 360 enables the light source 312 to emit the distance measurement beam 10 to the surface C of the surrounding object 380. The distance measurement beam 10 arrives at the surface C of the surrounding object 380. When arriving at the surrounding object 380, the distance measurement beam 10 is reflected by the surface C of the surrounding object 380 to have a type 50 of light reflected in various parts. Some 30 of the light reflected in various parts are collected by the light reception lens 324 included in the scanner 300 to the light reception sensor 322 of the light reception unit 320. The light reception sensor 322 transmits a position value p of the light collected at the light reception sensor 322 to the distance calculation unit 362. At this point, for detecting the precise p value, the wavelength filter 326 may be disposed between the light reception lens 324 and the light reception sensor 322. The wavelength filter 326 passes the light having the same wavelength as that emitted from the light source 312 to prevent other external light from being detected.

The distance calculation unit 362 of the central controller 360 may calculate the distance between the surface C of the surrounding object and the scanner 300 by using the triangulation method described in relation to FIG. 1 on the basis of the light position value p received from the light reception sensor 122.

When using the above-described method, the scanner 300 may measure the distance between the scanner 300 and the surrounding object 380 while vertically moving the measurement position. In addition, every time the slope of the support plate 390 moves at a certain angle, the distance between the scanner 300 and the surrounding object 380 may be measured.

Figure 6:
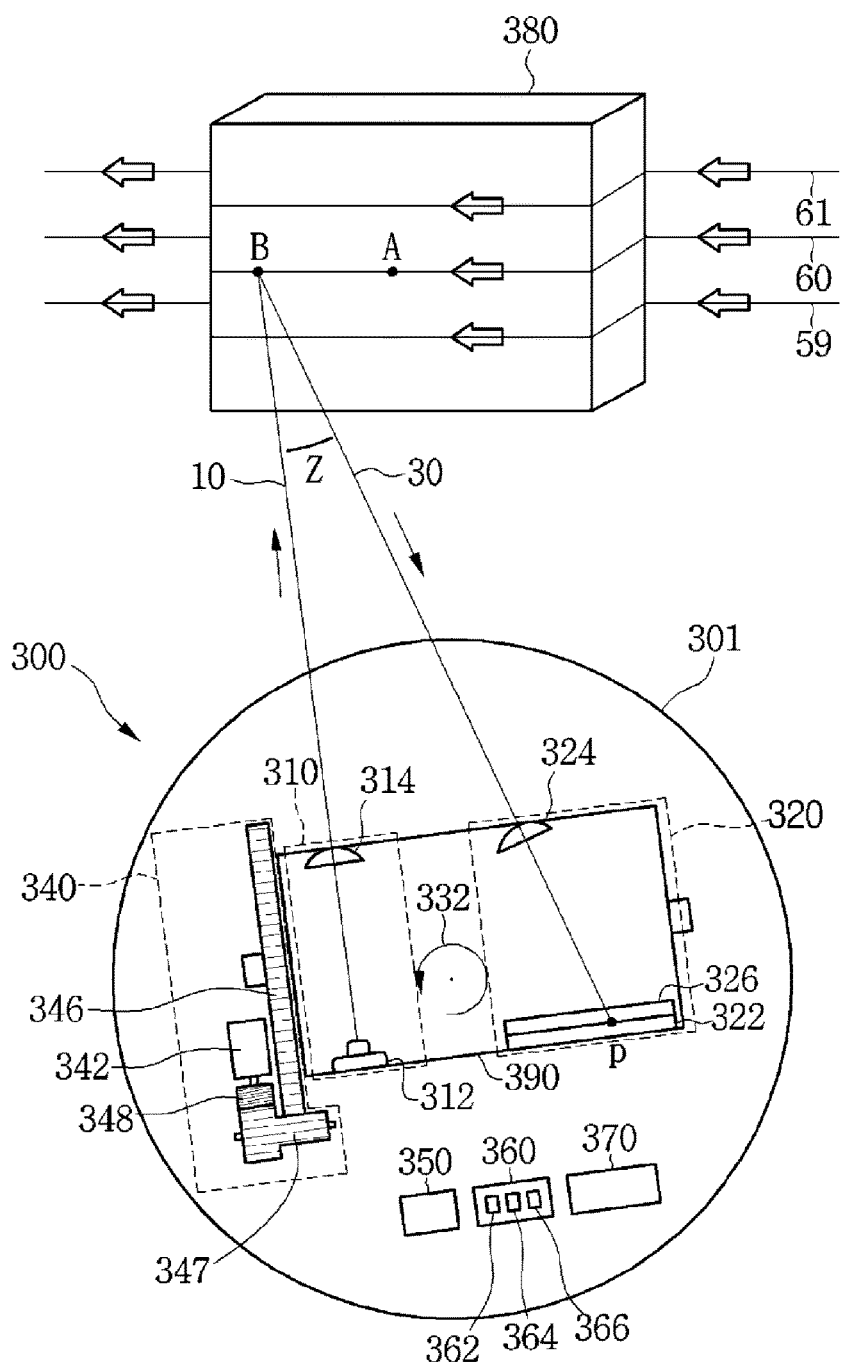
FIG. 6 illustrates an operation method of a rotation driving unit and title driving unit of a scanner according to an embodiment.

FIG. 6 illustrates that when the rotation driving unit 330 and the tilt driving unit 340 of the scanner 300 are driven together to measure the distance between the scanner 300 and the surrounding object 380, the measurement is performed while moving the measurement position along a direction of a plurality of horizontal lines 59, 60, and 61.

As described above, the central controller 360 may drive the rotation driving unit 330 by using the rotation and tilt controller 364 to horizontally rotate the rotation unit 301 in the counterclockwise direction 332. In addition, the central controller 360 of the scanner 300 may drive the tilt driving unit 340 by using the rotation and tilt controller 364 to vertically adjust the slope of the support plate 390.

When the central controller 360 drives the rotation driving unit 330 to rotate the rotation unit 301 and drives the tilt driving unit 340 to vertically adjust the slope of the support plate 390 to which the light transmission unit 310 and the light reception unit 320 are fixed, at the time of measurement of the distance between the scanner 300 and the surrounding object 380, the measurement may be performed while the measurement position is moved along the direction of the plurality of horizontal lines 59, 60, and 61.

For example, as described in relation to FIG. 3, the central controller 360 of the scanner 300 may drive the rotation driving unit 330 by using the rotation and tilt controller 364 to horizontally rotate the rotation unit 301 in the counterclockwise direction 332. Every time the rotation unit 301 is rotated at the certain angle, the central controller 360 of the scanner 300 may obtain the distance between the scanner 300 and the surrounding object 380. According to the rotation of the rotation unit 301, the distance between the scanner 300 and the surrounding object 380 may be measured in the horizontal direction while the distance measurement position is moved to the left on the first horizontal line 60.

Then, the central controller 360 may drive the tilt driving unit 340 by using the rotation and tilt controller 364 to adjust the slope angle of the support plate 390 in a downward direction of the surrounding object 380.

The central controller 360 may drive the rotation driving unit 330 by using the rotation and tilt controller 364 to horizontally rotate the rotation unit 301 in the counterclockwise direction 332 in a state where the slope angle of the support plate 390 is adjusted in the downward direction of the surrounding object 380. When the rotation unit 301 rotates, the distance between the scanner 300 and the surrounding object 380 may be measured in the horizontal direction while the distance measurement position is moved to the left on the second horizontal line 59.

Then, the central controller 360 may drive the tilt driving unit 340 by using the rotation and tilt controller 364 to adjust the slope of the support plate 390 in the upward direction of the surrounding object 380.

The central controller 360 may drive the rotation driving unit 330 by using the rotation and tilt controller 364 to horizontally rotate the rotation unit 301 in the counterclockwise direction 332 in a state where the slope angle of the support plate 390 is adjusted in the upward direction of the surrounding object 380. When the rotation unit 301 rotates, the distance between the scanner 300 and the surrounding object 380 may be measured in the horizontal direction while the distance measurement position is moved to the left on the third horizontal line 61.

As described above, the distance between the scanner 300 and the surrounding object 380 may be measured in the order of an intermediate part through which the first horizontal line 60 of the surrounding object 380 passes, a lower end part through which the second horizontal line 59 passes, and an upper end part through which the third horizontal line 61 passes. In addition, the distance measurement order may be in the order of the lower end part, the intermediate part and the upper end part, or in the order of the upper end part, the intermediate part, and the lower end part. In addition to this, the distance measurement order may also be random. In order to obtain more precise spatial information data, the distance between the scanner 300 and the surrounding object 380 may be measured in more horizontal directions.

The spatial information operation unit 366 performs coordinate calculation and makes spatial information data on the basis of respective distances corresponding to respective measurement positions calculated by the distance calculation unit 362 and rotation angles and tilt angles (slope angles) of the rotation unit 301 and the support plate 390, which correspond to the respective measurement positions. The rotation angles and tilt angles (slope angles) of the rotation unit 301 and the support plate 390 are respectively transmitted from the rotation driving unit 330 and the tilt driving unit 340 to the spatial information operation unit 366. In addition, the rotation angles and tilt angles (slope angles) of the rotation unit 301 and the support plate 390 are also respectively transmitted from the rotation and tilt controller 364 to the spatial information operation unit 366.

Figure 7:
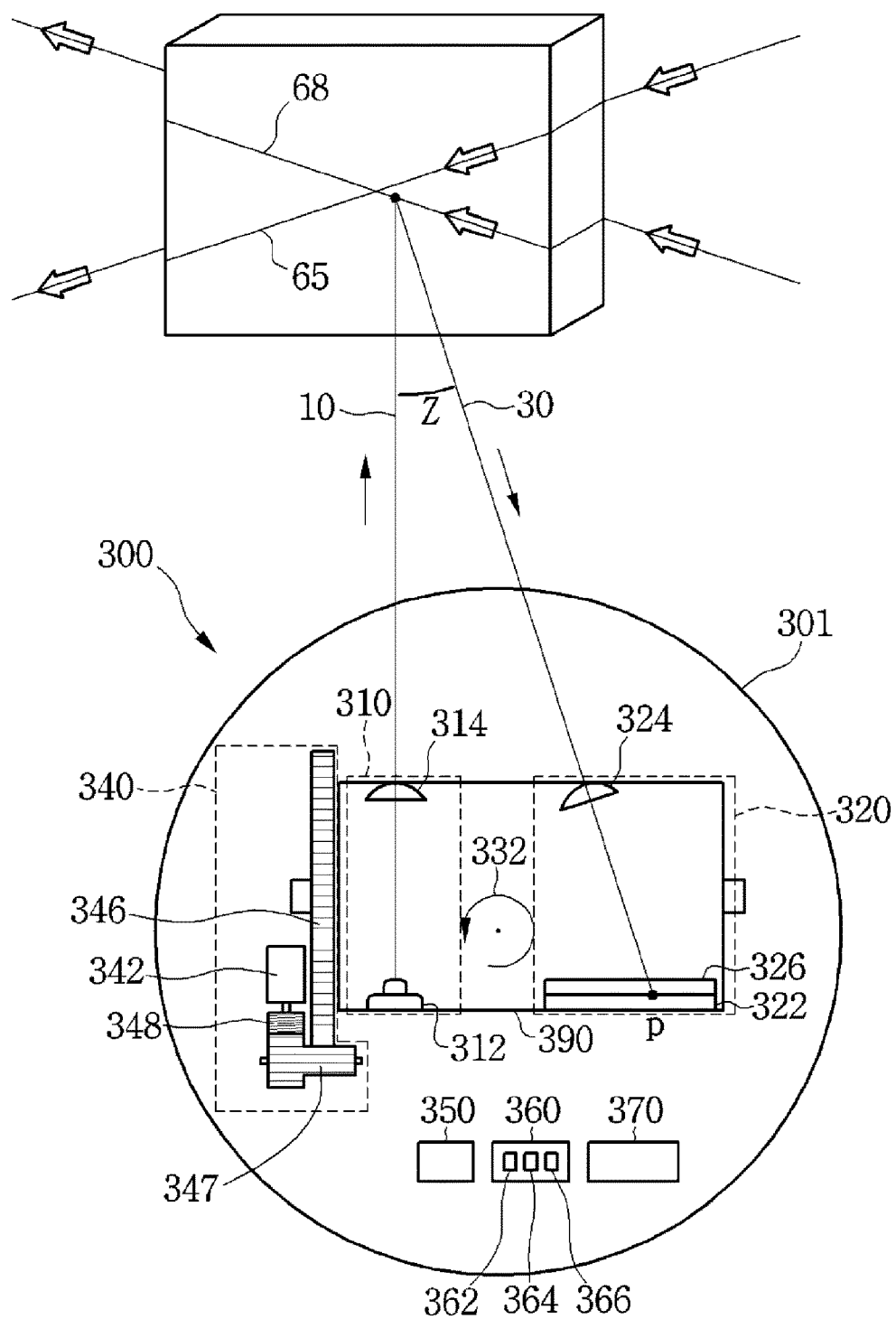
FIG. 7 illustrates an operation method of a rotation driving unit and title driving unit of a scanner according to an embodiment.

FIG. 7 illustrates that when the rotation driving unit 330 and the tilt driving unit 340 of the scanner 300 are driven together to measure the distance between the scanner 300 and the surrounding object 380, while the measurement position is moved in directions of diagonal lines 65 and 68.

As described above, the central controller 360 may drive the rotation driving unit 330 by using the rotation and tilt controller 364 to horizontally rotate the rotation unit 301 in the counterclockwise direction 332. In addition, the central controller 360 of the scanner 300 may drive the tilt driving unit 340 by using the rotation and tilt controller 364 to vertically adjust the slope of the support plate 390.

When the central controller 360 drives the rotation driving unit 330 to rotate the rotation unit 301 and drives the tilt driving unit 340 to vertically adjust the slope of the support plate 390 to which the light transmission unit 310 and the light reception unit 320 are fixed, the scanner 300 may move and measure the distance measurement position in the directions of diagonal lines 65 and 68.

The central controller 360 of the scanner 300 may drive the rotation driving unit 330 and the tilt driving unit 340 by using the rotation and tilt controller 364 to adjust the slope of the support plate 390, every time the rotation unit 301 rotates at a certain angle. In addition, on the contrary, every time the slope of the support plate 390 varies at a certain angle, a rotation angle of the rotation unit 301 may be adjusted. FIG. 7 illustrates that measurement is performed by adjusting the slope of the support plate 390 in the downward direction of the surrounding object 380 to move the distance measurement position in the direction of the first diagonal line 65, every time the rotation unit 301 rotates at a certain rotation angle. In addition, every time the rotation unit 301 rotates at a certain rotation angle, measurement is performed by adjusting the slope of the support plate 390 in the upward direction of the surrounding object 380 to move the distance measurement position in the direction of the second diagonal line 68.

Figure 8:
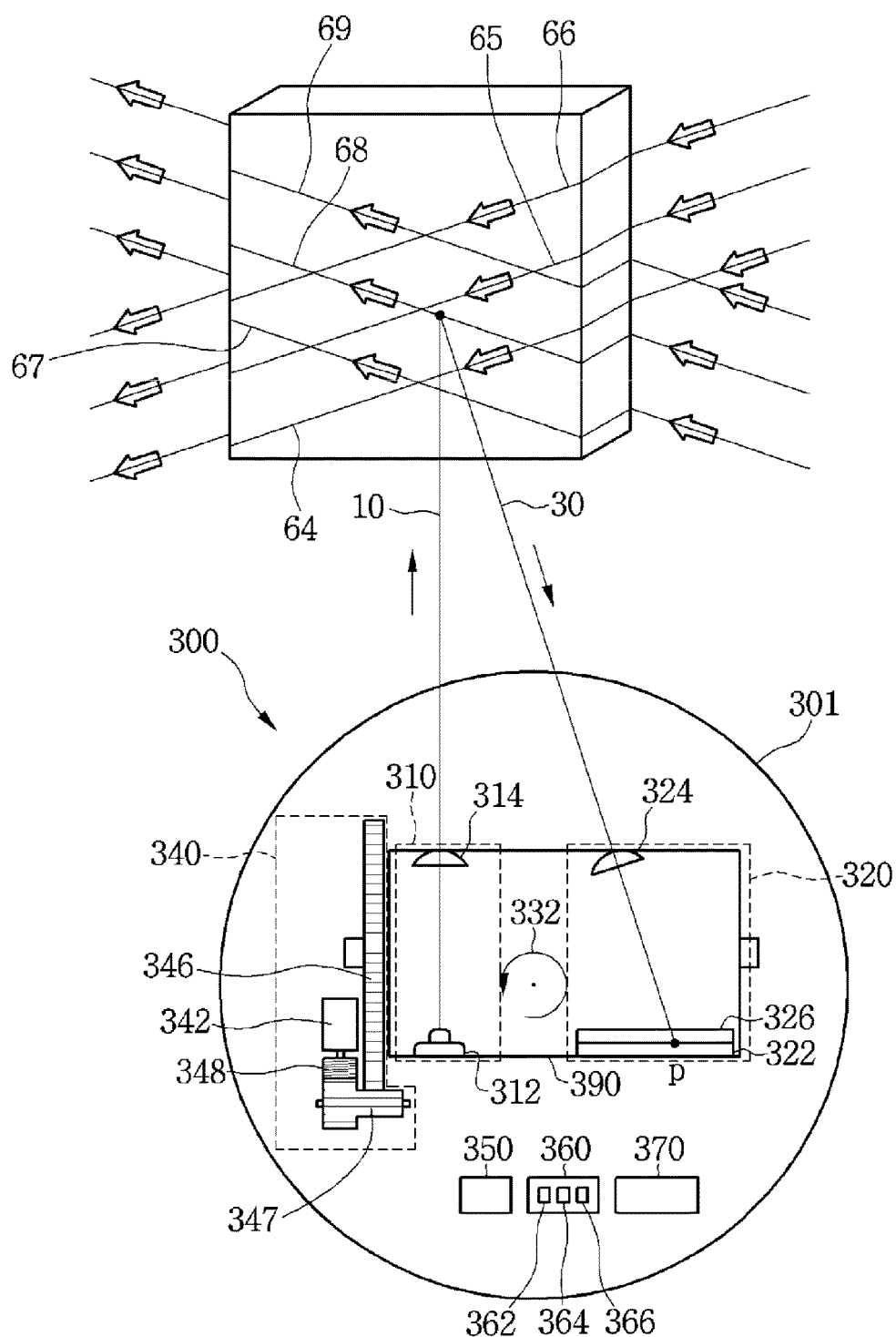
FIG. 8 illustrates an operation method of a rotation driving unit and title driving unit of a scanner according to an embodiment.

FIG. 8 illustrates that the distance between the scanner 300 and the surrounding object 380 may be measured while the distance measurement position is moved in directions of a plurality of diagonal lines 64 to 69 by using the content described in relation to FIG. 7. For example, the distance between the scanner 300 and the surrounding object 380 may be measured by moving the distance measurement position in directions of a third diagonal line 66, a first diagonal line 65, a fourth line 64, a fifth line 67, a second line 68, and a sixth line 69 in the order named.

The above-described distance measurement directions 64 to 69 may be differed in the order according to a user or measurement environment if necessary. In order to obtain more precise spatial information data, the distance between the scanner 300 and the surrounding object 380 may be measured in more diagonal directions.

The scanner 300 may measure the distances in various patterns according to the surrounding environment and the surrounding object 380 to perform coordinate calculation and make 3D spatial data while horizontally and vertically moving the measurement position.

Figure 9:
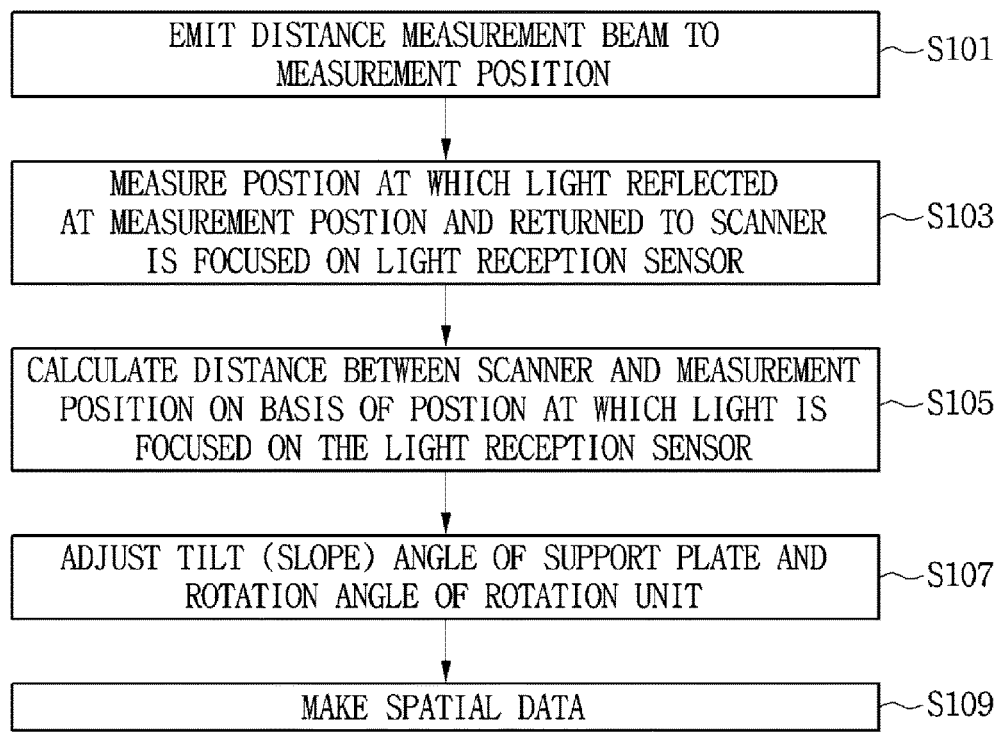
FIG. 9 illustrates an operation method of a scanner according to an embodiment.

FIG. 9 illustrates an operation method of a scanner according to an embodiment.

According to the present embodiment, the scanner 300 may perform coordinate calculation and make spatial information data by using a light transmission unit 310, a light reception unit 320, a rotation driving unit 330, a tilt driving unit 340, and a central controller 360.

As described above, the central controller 360 may include a distance calculation unit 362, a rotation and a tilt controller 364, and a spatial information operation unit 366.

Firstly, the central controller 360 enables a distance measurement beam 10 to be emitted to a measurement position by using a light source 312. For example, the distance measurement beam 10 is enabled to be emitted to the surrounding object 380 (operation S101).

The light reflected by the measurement position and returned to the scanner 300 is focused at the light reception sensor 322. The light reception sensor 322 senses a position at which the light is focused (operation S103).

The distance calculation unit 362 of the scanner 300 calculates the distance between the scanner 300 and the measurement position on the basis of the position at which the light is focused on the light reception sensor 322 (operation S105).

The rotation and tilt controller of the scanner 300 drives the rotation driving unit 330 and the tilt driving unit 340 to adjust a tilt angle of the support plate 390 and a rotation angle of the rotation unit 301 and adjusts the light source 312 to be capable of emitting the light to the next measurement position (operation S107).

The spatial information operation unit 366 of the central controller 360 performs coordinate calculation and makes spatial data by using the measurement distances corresponding to a plurality of measurement positions and a rotation angle and a tilt angle (slope angle) corresponding to each of the plurality of measurement positions by repeating the above-described operations S101, S103, S105, and S107 (operation S109).

Figure 10A:
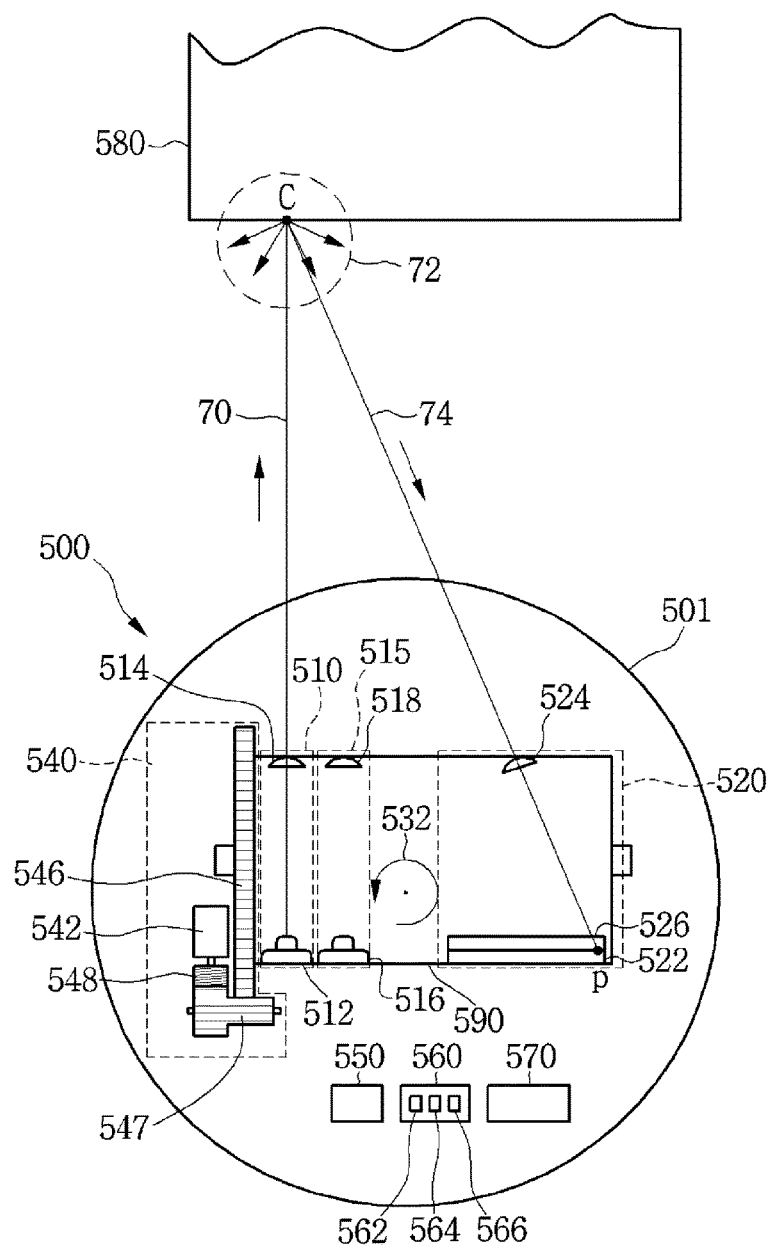
FIGS. 10a and 10b illustrate an operation method of a scanner according to an embodiment.
Figure 10B:
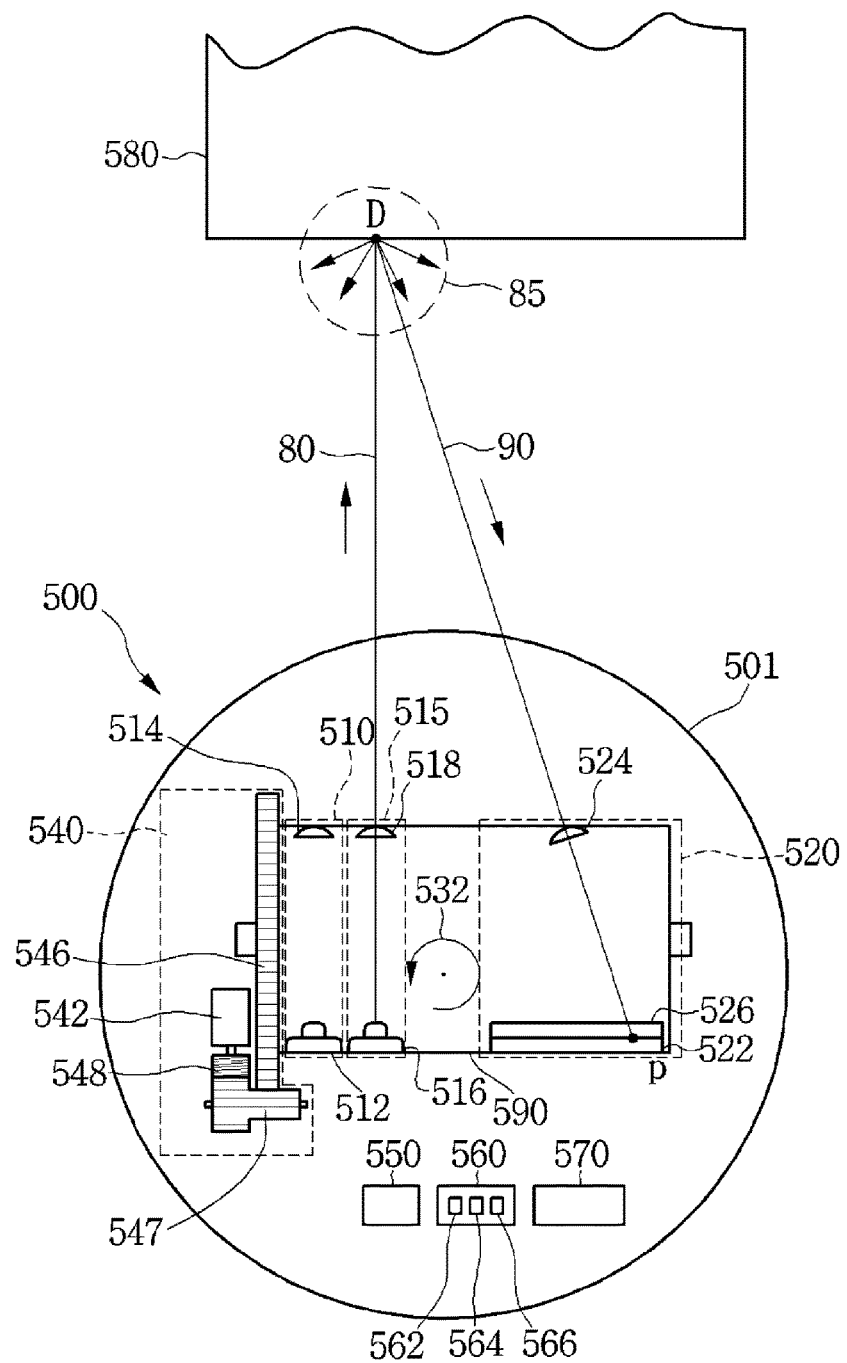

FIGS. 10a and 10b are block diagrams illustrating a basic operation method of a scanner according to an embodiment.

The scanner 500 may include a first light transmission unit 510, a second light transmission unit 515, a light reception unit 520, a rotation driving unit 530, a tilt driving unit 540, a communication unit 550, a central controller 560, and a power supplying unit 570.

The scanner 500 is an embodiment of the scanner 300 including a plurality of light transmission units.

The first light transmission unit 510, second light transmission unit 515, and light reception unit 520 are fixed to the support plate 590. The first light transmission unit 510 may include a first light source 512 and a first light source lens 514. The second light transmission unit 515 may include a second light source 516 and a second light source lens 518. The first and second light sources 512 and 516 may adopt a laser diode (LD) or a light emitting diode (LED), and each of the first and second light source lenses 514 and 518 may adopt a collimator lens to make a light output from each of the light sources 512 and 516 as parallel light or convergent light.

The light reception unit 520 may include a light reception sensor 522, a light reception lens 524, and a wavelength filter 526. The light reception lens 524 collects light to the light reception sensor 522 and the light reception sensor 522 senses a position of the light collected by the light reception lens 524. The wavelength filter 526 prevents light having a different wavelength from those emitted from the first and second light source 512 and 516 from being sensed by the light reception sensor 522.

The support plate 590 to which the first light transmission unit 510, the second light transmission unit 515, and the light reception unit 520 are fixed and the tilt driving unit 540 are fixed to the rotation unit 501.

The rotation driving unit 530 may be configured to be horizontally rotated the rotation unit 501. In addition, when the rotation driving unit 501 horizontally rotates the rotation unit 501, a support plate 590 fixed to the rotation unit 301 rotates in the horizontal direction identical to that of the rotation unit 301. While FIG. 10a illustrates that the rotation driving unit 530 rotates the rotation unit 501 in the counterclockwise direction 532, the rotation driving unit 530 may also rotate the rotation unit 301 in the clockwise direction. The rotation driving unit 530 may include an encoder, and the encoder may transmit rotation angle information as an encoder signal to a spatial information operation unit 566.

The tilt driving unit 540 is configurable to adjust the slope of the support plate 590. For example, the tilt driving unit 540 may include a tilt driving motor 542, a first tilt driving gear 546, a second tilt driving gear 547, and a third tilt driving gear 548. The tilt driving motor 542 rotates the tilt driving gears 546, 547, and 548 to vertically adjust the slopes of the first light transmission unit 510, the second light transmission unit 515, and the light reception unit 520. The rotation driving unit 540 may include an encoder, and the encoder may transmit rotation angle information as an encoder signal to a spatial information operation unit 566.

The central controller 560 may be located in the support plate 590 or the rotation unit 501. The central controller 560 may include a distance calculation unit 562, a rotation and tilt controller 564, and a spatial information operation unit 566. The distance calculation unit 562 calculates a distance between the scanner 500 and the measurement position on the basis of a light position value p transmitted from the light reception sensor 522. The rotation and tilt controller 564 controls the rotation driving unit 530 and the tilt driving unit 540. The spatial information operation unit 566 performs coordinate calculation and makes spatial information data on the basis of the distance calculated by the distance calculation unit 562 and a rotation angle and tilt angle respectively transmitted from the rotation driving unit 530 and tilt driving unit 540. When the rotation driving unit 530 and tilt driving unit 540 transmit the rotation angle and tilt angle information through the encoder signal, the spatial information operation unit 566 may calculate the rotation angle and tilt angle from the encoder signal. In addition, the central controller 560 controls the entire operation of the scanner 500. The central controller 560 may transmit data made by the spatial information operation unit 566 to an external device through the communication unit 550 in a wireless/wired manner.

The power supplying unit 570 receives external and internal powers under a control of the central controller 560 and supplies power necessary for operating each element.

Since the elements illustrated in FIGS. 10a and 10b are not essential, a scanner including more or less elements than those may be implemented.

FIG. 10a illustrates that the distance between the scanner 500 and surrounding object 580 is measured by using a first distance measurement beam 70.

The central controller 560 enables the first light source 512 to emit a first distance measurement beam 70 to the surrounding object 580. The first distance measurement beam 70 arrives at the surrounding object 580. When arriving at the surrounding object 580, the first distance measurement beam 70 is reflected by the surface C of the surrounding object 580 to have a type 72 of light reflected in various parts. Some 74 of the light reflected in various parts are collected by the light reception lens 524 included in the scanner 500 to the light reception sensor 522 of the light reception unit 520. The wavelength filter 526 disposed between the light reception lens 524 and the light reception sensor 522 passes only light having an identical wavelength to that emitted from the first light source 512 to prevent other external light from being sensed by the light reception sensor 522. The light reception sensor 522 transmits a position value p of the light focused by the light reception lens 524 at the light reception sensor 522 to the distance calculation unit 562 of the central controller 560. The light reception sensor 522 may transmit the p value in a digital or analog signal to the distance calculation unit 562.

The distance calculation unit 562 of the central controller 560 may calculate the distance between the surface C of the surrounding object and the scanner 500 by using the triangulation method described in relation to FIG. 1 on the basis of the light position value p received from the light reception sensor 522.

When the light collected at the light reception sensor 522 is not enough so that the light reception sensor 522 does not detect the position of the light collected at the light reception sensor 522 and the distance calculation unit 563 does not receive the position information value p, as illustrated in FIG. 10b, the central controller 560 enables the second light source 516 to emit a second distance measurement beam 80 to the surrounding object 580.

The second distance measurement beam 80 arrives at the surrounding object 580. When arriving at the surrounding object 580, the second distance measurement beam 80 is reflected by the surface D of the surrounding object 580 to have a type 85 of light reflected in various parts. Some 90 of the light reflected in various parts are collected by the light reception lens 524 included in the scanner 500 at the light reception sensor 522 of the light reception unit 520. The wavelength filter 526 disposed between the light reception lens 524 and the light reception sensor 522 passes only a wavelength of the second light source 512 to block other external light from the light reception sensor 522. The light reception sensor 522 transmits the position of the light focused by the light reception lens 524 at the light reception sensor 522 to the distance calculation unit 562 of the central controller 560.

The distance calculation unit 562 of the central controller 560 may calculate the distance between the surface D of the surrounding object and the scanner 500 by using the triangulation method described in relation to FIG. 1 on the basis of the light position value p received from the light reception sensor 522.

As illustrated in FIGS. 10a and 10b, the scanner 500 may include a plurality of light transmission units 510 and 515. In FIGS. 10a and 10b, the scanner 500 includes two light transmission units 510 and 515, but the scanner 500 may include two or more light transmission units.

Since the distance between the scanner 500 and the surrounding object 580 is not always constant, an angle of light reflected by the surrounding object 580 and incident to the light reception lens 525 is not constant. Since an angle or intensity or amount of light incident to the light reception sensor 522 through the light reception lens 525 may be differed according to the angle of the light incident to the light reception lens 525, the position value p of the light collected at the light reception sensor 522 may be precisely detected or not by the light reception sensor 522. When the position value p of the light collected at the light reception sensor 522 is not precisely sensed by the light reception sensor 522, the distance between the scanner 500 and the surrounding object 580 may not be precisely measured.

For precise distance measure, the central controller 560 may adjust a value of g that is a distance between a light source lens and a light reception lens to adjust an angle of the light incident to the light reception lens 525. For example, the central controller 560 enables the first light source 512 of the first light transmission unit 510, which is the farthest from the light reception unit 520, to emit the first distance measurement beam 70 to the surrounding object 580. As described above, when arriving at the surrounding object 580, the first distance measurement beam 70 is reflected by the surface C of the surrounding object 580 to have a type 72 of light reflected in various parts. Some 74 of the light reflected in various parts are collected by the light reception lens 524 included in the scanner 500 to the light reception sensor 522 of the light reception unit 520.

The distance calculation unit 562 of the central controller 560 may calculate the distance between the surface D of the surrounding object and the scanner 500 by using the triangulation method described in relation to FIG. 1 on the basis of the light position value p received from the light reception sensor 522. The g value used at this point is the distance between the first light source lens 514 and the light reception lens 524.

When the light collected at the light reception sensor 522 is not enough so that the light reception sensor 522 does not sense the position of the light collected at the light reception sensor 522 and the distance calculation unit 562 does not receive the position information value p, as illustrated in FIG. 10b, the central controller 560 enables the second light source 516 to emit a second distance measurement beam 80 to the surrounding object 580.

As described above, when arriving at the surrounding object 580, the second distance measurement beam 80 is reflected by the surface D of the surrounding object 580 to have a type 85 of light reflected in various parts. Some 90 of the light reflected in various parts are collected by the light reception lens 524 included in the scanner 500 to the light reception sensor 522 of the light reception unit 520.

At this point, an angle of the light 90 collected to the light reception sensor 522 through the light reception lens 524 is different from that of the light 74 collected to the light reception lens 522 through the light reception lens 524.

The distance calculation unit 562 of the central controller 560 may calculate the distance between the surface D of the surrounding object and the scanner 500 by using the triangulation method on the basis of the light position value p received from the light reception sensor 522. The g value used at this point is the distance between the first light source lens 518 and the light reception lens 524.

As described above, the scanner 500 may include a plurality of light transmission units, and as described in relation to FIGS. 10*a* and 10*b*, the central controller 560 may obtain the distance between the scanner 500 and the surrounding object 580 while changing the light transmission unit.

In FIGS. 10*a* and 10*b*, the central controller 560 firstly attempts to measure a distance by using the first light source 512 of the first light transmission unit 510 that is the farthest from the light reception unit 520. At this point, when the light reception sensor 522 does not sense the position of the light collected to the light reception sensor 522 because the light collected to the light reception sensor 522 is not enough, the central controller 560 attempts to measure the distance by using the second light source 516 of the second light transmission unit 515 that is the nearest to the light reception unit 520.

On the contrary, the central controller 560 attempts to measure the distance by using the second light source 516 of the second light transmission unit 515 that is the nearest to the light reception unit 520. At this point, when the light reception sensor 522 does not sense the position of the light collected to the light reception sensor 522 because the light collected to the light reception sensor 522 is not enough, the central controller 560 may also attempt to measure the distance by using the first light source 512 of the first light transmission unit 510 that is the farthest from the light reception unit 520.

In other words, an order that the central controller 560 selects the light transmission unit may be an order from the light transmission unit nearest to the light reception unit 520 to the light transmission unit farthest from the light reception unit 520, or may be an order from the light transmission unit farthest from the light reception unit 520 to the light transmission unit nearest to the light transmission unit 520. Alternatively, the order may be random.

The scanner 500 may horizontally rotate the rotation unit 590 like the scanner 300 of FIG. 2*a* and vertically adjust the slope of the support plate 590. Through this, the scanner 500 may measure the distance between the scanner 500 and the surrounding object 580 while moving the distance measurement position in the horizontal direction, vertical direction, and diagonal direction, like the scanner 300 of FIG. 2*a*. In addition, the spatial information operation unit 566 of the central controller 560 may perform coordinate calculation and make spatial data by using measurement distances corresponding a plurality of measurement positions and a rotation angle and a tilt angle (slope angle) corresponding to each of the plurality of the measurement positions.

Figure 11A:
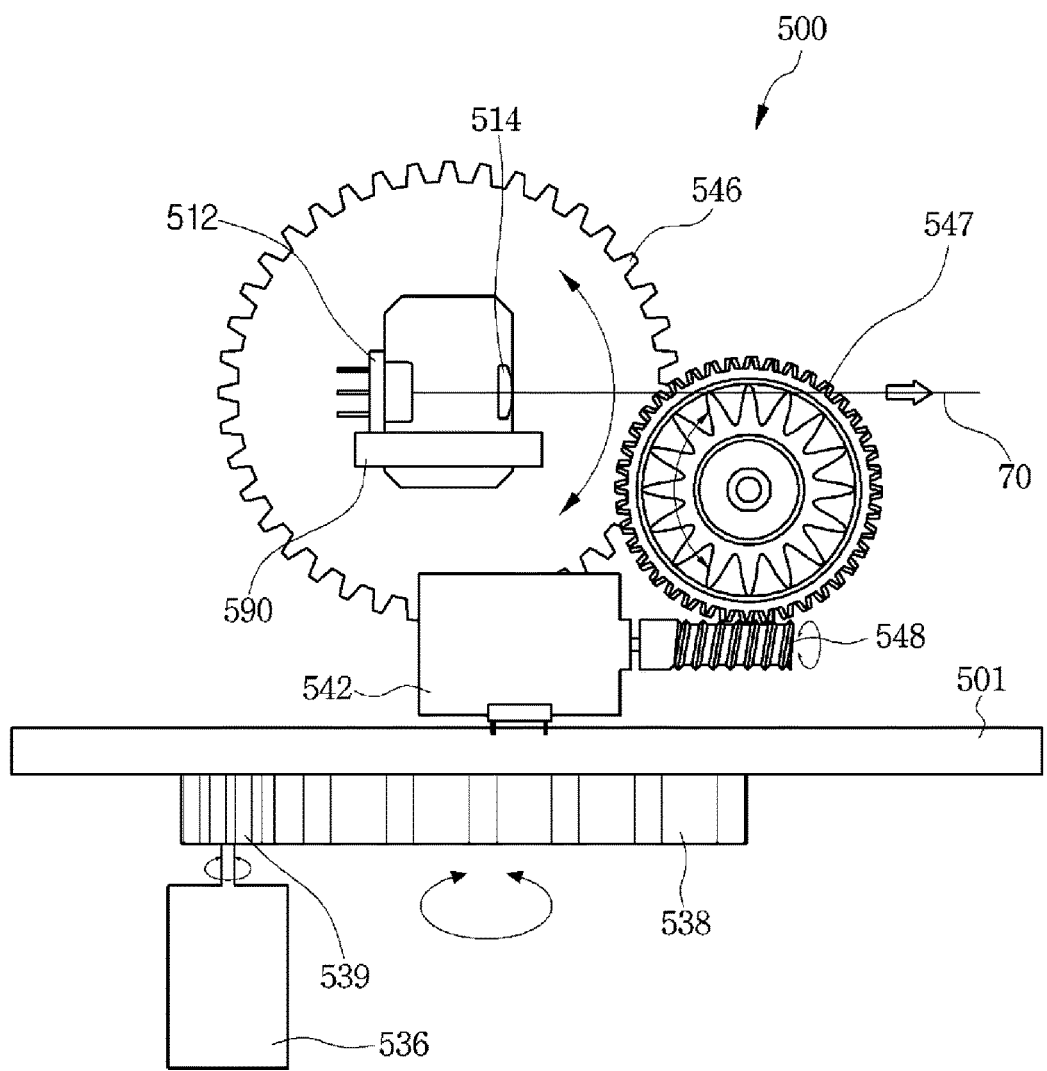
FIGS. 11a and 11b respectively illustrate examples of a tilt driving unit and a rotation driving unit used for an embodiment.

FIG. 11*a* illustrates an exemplary cross-sectional view of the rotation driving unit 530 and the tilt driving unit 540 of the scanner 500. The second light transmission unit 515 and the light reception unit 520 are not illustrated to represent the rotation unit 530 and the tilt driving unit 540 well in the drawing. The tilt driving unit 540 may be variously configurable to adjust the slope of the support plate 590. As described above, the tilt driving unit 540 may include a tilt motor 542, a first tilt driving gear 546, a second tilt driving gear 547, and a third tilt driving gear 548.

The first tilt driving gear 546 is fixed on a side surface of the support plate 590. The third tilt driving gear 548 is coupled to the tilt motor 542. The second tilt driving gear 547 is engaged between the first and third tilt driving gears 546 and 548. When rotating, the tilt motor 542 rotates the third tilt driving gear 548 and the third tilt driving gear 548 rotates the second tilt driving gear 547. When the second tilt driving gear 547 rotates, the first tilt driving gear 546 rotates. The slope of the support plate 590 becomes differed according to rotation of the first tilt driving gear 546.

FIG. 11*a* illustrates that the above-described tilt driving gears 546, 547, and 548 are rotated by using the tilt driving motor 542 to vertically adjust the slope of the support plate 590 to which the light emission unit 510 and the light reception unit 520 are fixed. When the slope of the support plate 590 is adjusted, the slopes of the light emission unit 510 and the light reception unit 520 may be adjusted together. When the rotation and tilt controller 564 of the central controller 560 controls the tilt driving unit 540 to adjust the slope of the support plate 590 to which the light emission unit 510 and the light reception unit 520 are fixed, the scanner 500 may measure the distance between the scanner 500 and the surrounding object 580 while vertically adjusting the distance measurement position.

The rotation driving unit 530 may be variously configured to horizontally rotate the rotation unit 501. For example, the rotation driving unit 530 may adjust rotation of the rotation unit 501 by using the rotation driving motor 536, the first rotation driving gear 538, and the second rotation driving gear 539.

The first rotation driving gear 538 is fixed at the center of the bottom surface of the rotation unit 501 and the second rotation driving gear 539 is coupled to the rotation driving motor 536. The first rotation driving gear 538 and the second rotation driving gear 539 are engaged to rotate.

Therefore, when the rotation driving motor 536 rotates, the second rotation driving gear 539 coupled to the rotation driving motor 536 rotates together and the first rotation driving gear 538 coupled to the second rotation driving gear 539 rotates together. In addition, when the first rotation gear 538 rotates, the rotation unit 501 rotates together.

FIG. 11*a* illustrates that the rotation driving gears 538 and 539 are rotated by using the rotation driving motor 536 to horizontally rotate the rotation unit 501 to which the support plate 590 and the tilt rotation unit 540 are fixed.

When the rotation unit 501 is rotated, the light emission unit 510 and the light reception unit 520 are also rotated in an identical direction. When the rotation and tilt controller 564 of the central controller 560 controls the tilt driving unit 530 to rotate the support plate 590 to which the light emission unit 510 and the light reception unit 520 are fixed, the scanner 500 may horizontally adjust the distance measurement position to measure the distance between the scanner 500 and the surrounding object 580.

Figure 11B:
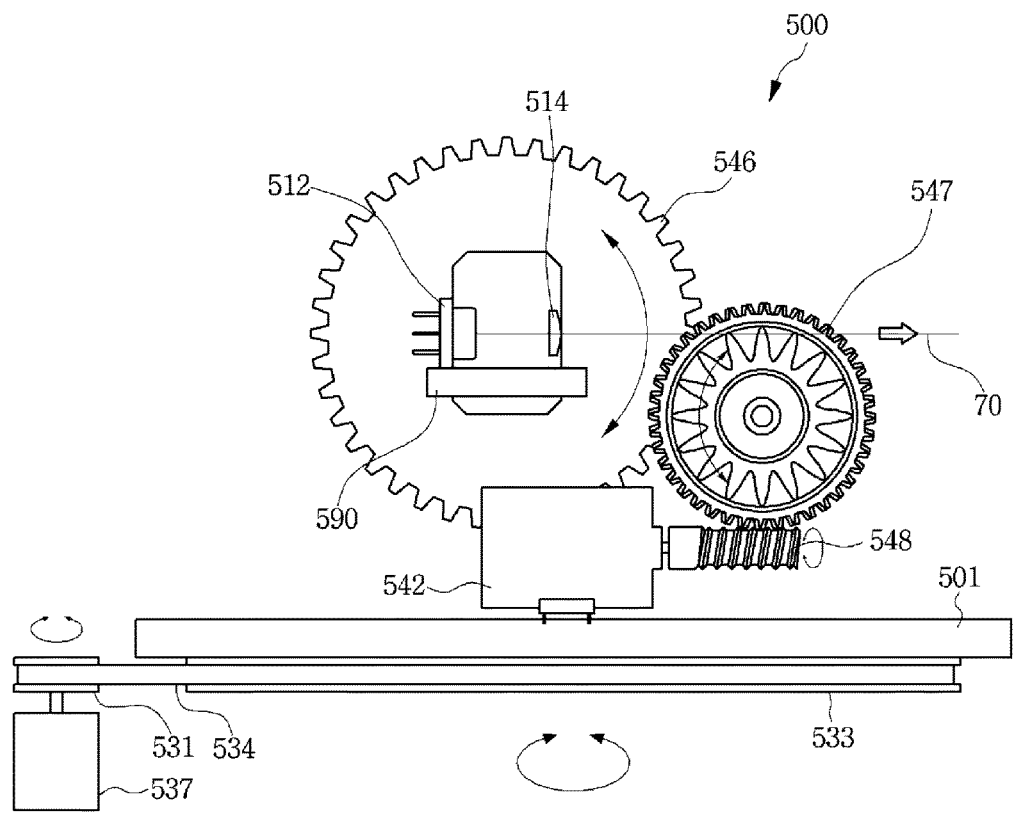

FIG. 11b illustrates an exemplary cross-sectional view of the rotation driving unit 530 and the tilt driving unit 540 of the scanner 500. The light reception unit 520 is not illustrated to represent the rotation unit 530 and the tilt driving unit 540 well in the drawing. The tilt driving unit 540 may be variously configurable to adjust the slope of the support plate 590.

The tilt driving unit 540 of FIG. 11b operates identically to the description in relation to FIG. 11A. However, the rotation driving unit 530 of FIG. 11b is configured differently.

The rotation driving unit 530 of FIG. 11b may adjust the rotation of the rotation unit 501 by using a pulley driving motor 537, a first pulley 533, a second pulley 531, and a pulley belt 534.

The first pulley 533 is fixed at the center of the bottom surface of the rotation unit 501 and the second pulley 531 is coupled to the pulley driving motor 537. The first pulley 533 and the second pulley 531 are coupled to the pulley belt 534 and rotate.

Therefore, when the pulley driving motor 537 rotates, the second pulley 531 coupled to the pulley driving motor 537 rotates together and the first pulley 338 coupled to the second pulley 331 rotates together. In addition, when the first pulley 533 rotates, the rotation unit 501 rotates together.

FIG. 11b illustrates that the pulleys 531 and 533 are rotated by using the pulley driving motor 537 to horizontally rotate the rotation unit 501 to which the support plate 590 and the tilt rotation unit 540 are fixed.

When the rotation unit 501 is rotated, the light emission unit 510 and the light reception unit 520 also rotate in an identical direction. When the rotation and tilt controller 564 of the central controller 560 controls the tilt driving unit 530 to rotate the support plate 590 to which the light emission unit 510 and the light reception unit 520 are fixed, the scanner 500 may horizontally adjust the distance measurement position to measure the distance between the scanner 500 and the surrounding object 580.

Figure 12:
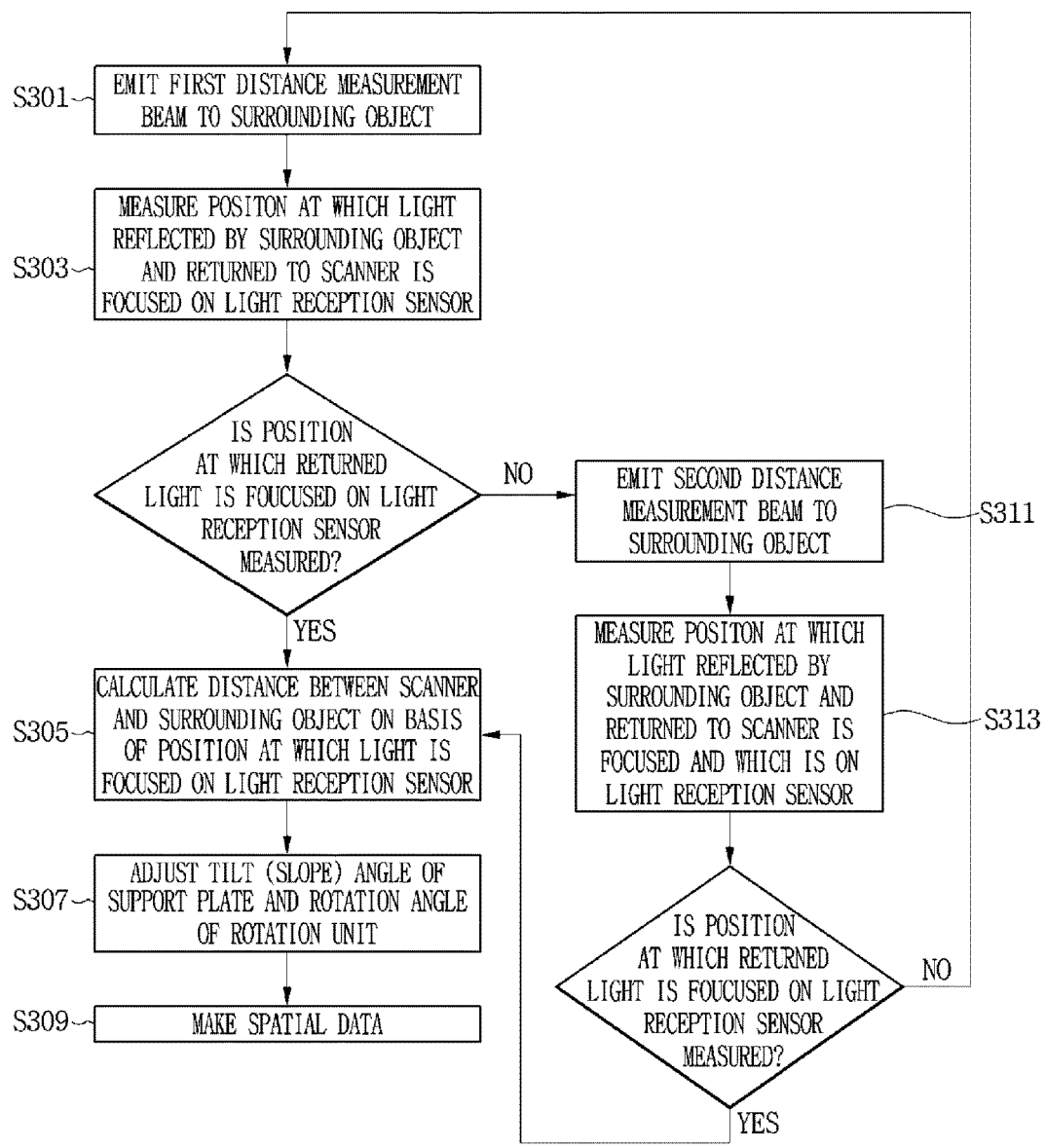
FIG. 12 illustrates an operation method of a scanner according to an embodiment.

FIG. 12 illustrates an operation method of a scanner 500 according to an embodiment.

According to the present embodiment, the scanner 500 may make spatial information data by using the first light transmission unit 510, the second light transmission unit 515, the light reception unit 520, the rotation driving unit 530, the tilt driving unit 540, and the central controller 560.

The first light transmission unit 510, second light transmission unit 515, and light reception unit 520 are fixed to the support plate 590.

In addition, the support plate 590 to which the first light transmission unit 510, second light transmission unit 515, and light reception unit 520 are fixed, and the tilt driving unit 540 are fixed to the rotation unit 501.

As described above, the central controller 560 may include a distance calculation unit 562, a rotation and tilt controller 564, and a spatial information operation unit 566.

Firstly, the central controller 560 enables the first light source 512 to emit a distance measurement beam 70 to the surrounding object 580.

The first distance measurement beam 70 arrives at the surrounding object 580. The first distance beam 70 arrived at the surrounding object 580 is reflected by the surface of the surrounding object 580.

The light reflected by the surrounding object 580 and returned to the scanner 500 is focused at the light reception sensor 522. The light reception sensor 522 detects a p value of a position at which the light is focused on the light reception sensor 522 (operation S303).

When the p value of the position at which the light is focused is detected, the distance calculation unit 562 calculates the distance between the scanner and the surrounding object on the basis of the p value (operation S305).

The rotation and tilt controller of the scanner 500 drives the rotation driving unit 530 and the tilt driving unit 540 to adjust a tilt angle of the support plate 590 and a rotation angle of the rotation unit 501 to determine the next measurement position (operation S307).

The spatial information operation unit 566 of the central controller 560 performs coordinate calculation and makes spatial data by using the measurement distances corresponding to a plurality of measurement positions and a rotation angle and a tilt angle (slope angle) corresponding to each of the plurality of measurement positions by repeating the above-described operations S301, S303, S305, and S307 (operation S109).

When the p value of the position at which the light is focused on the light reception sensor 522, the central controller 560 enables the second light source 516 to emit a second distance measurement beam 80 to the surrounding object 580 (operation S311).

The light reflected by the surrounding object 580 and returned to the scanner 500 is focused at the light reception sensor 522. The light reception sensor 522 detects the p value of the position at which the light is focused on the light reception sensor 522 (operation S313).

When the p value of the position at which the light is focused on the light reception sensor 522 is detected, the distance calculation unit 562 calculates the distance between the scanner and the surrounding object on the basis of the p value (operation S305).

The rotation and tilt controller of the scanner 500 drives the rotation driving unit 530 and the tilt driving unit 540 to adjust a tilt angle of the support plate 590 and a rotation angle of the rotation unit 501 to determine the next measurement position (operation S307).

The spatial information operation unit 566 of the central controller 560 performs coordinate calculation and makes spatial data by using the measurement distances corresponding to a plurality of measurement positions and a rotation angle and a tilt angle (slope angle) corresponding to each of the plurality of measurement positions by repeating the above-described operations S311, S313, S315, and S317 (operation S309).

When the p value of the position at which the light is focused on the light reception sensor 522 is not detected in operation S313, the central controller 560 may attempt to measure the distance again by using the first distance measurement beam 70 from the light source 512 or stop the distance measurement.

In addition, when the scanner 500 includes another light transmission unit, the scanner 500 may attempt to measure the distance by using a light source of the other light transmission unit.

The scanner 500 may horizontally rotate the rotation unit 590 like the scanner 300 of FIG. 2a and vertically adjust the slope of the support plate 590. Through this, the scanner 500 may measure the distance between the scanner 500 and the surrounding object 580 while moving the distance measurement position in the horizontal direction, vertical direction, and diagonal direction, like the scanner 300 of FIG. 2a.

The scanner 500 may measure the distance in various patterns according to the surrounding environment and the surrounding object 580 to perform coordinate calculation and make 3D spatial data while horizontally and vertically moving the measurement position.

In addition, the spatial information operation unit 566 of the central controller 560 may perform coordinate calculation and make spatial data by using measurement distances corresponding a plurality of measurement positions and a rotation angle and a tilt angle (slope angle) corresponding to each of the plurality of the measurement positions.

Figure 13:
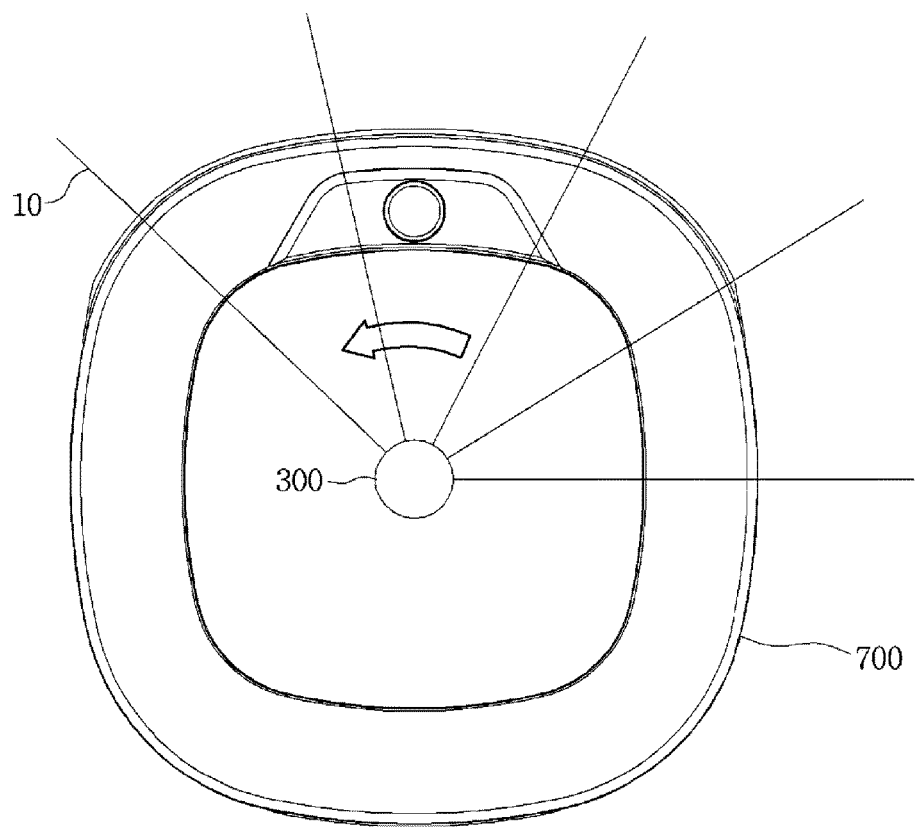
FIG. 13 illustrates an embodiment mounted to be used in a robot cleaner.

FIG. 13 illustrates a scanner 300 mounted in a vacuum cleaner robot 700 and used. When a distance between the surrounding object 380 and the cleaner robot is measured and spatial data is transmitted to the cleaner robot, the cleaner robot determines a moving path on the basis of received information in the embodiment.

Figure 14:
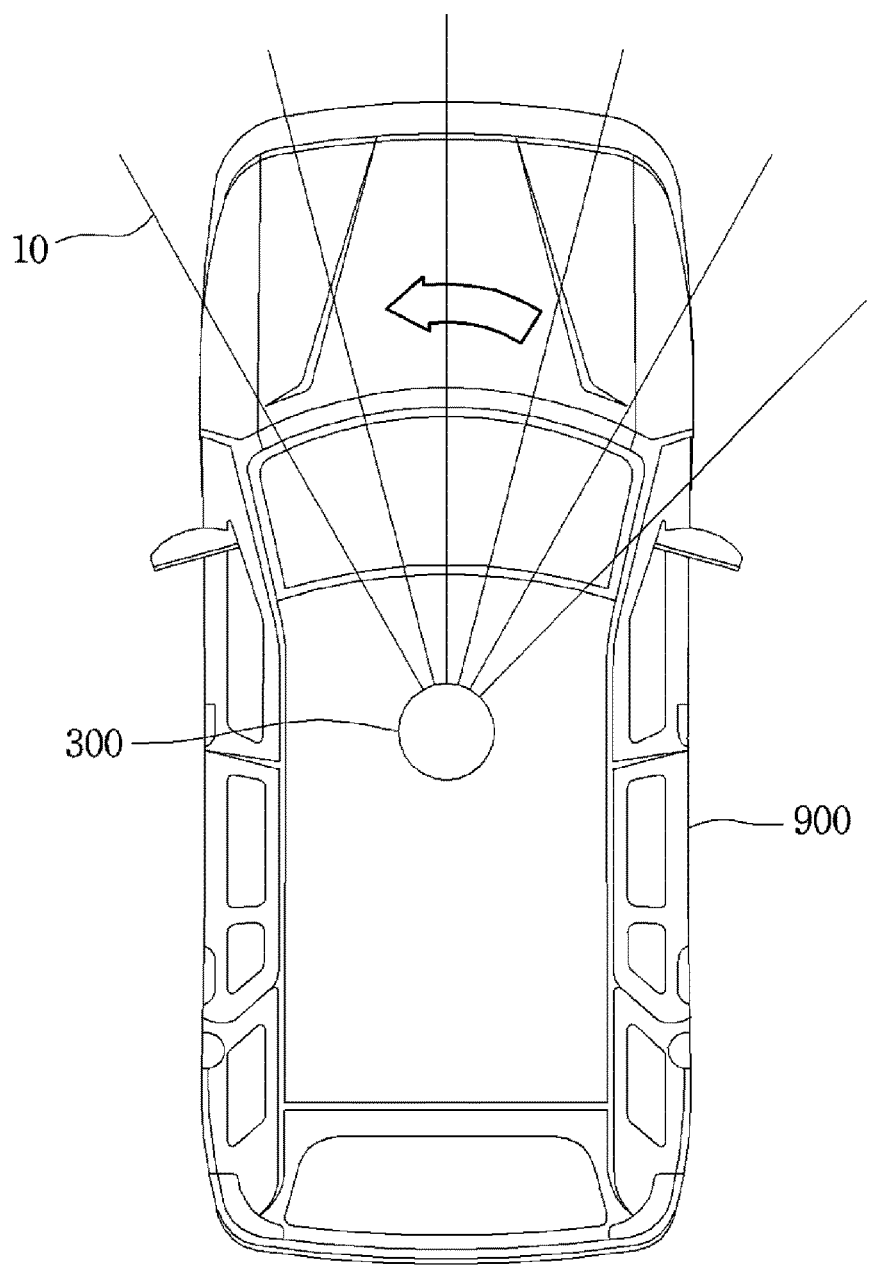
FIG. 14 illustrates an embodiment mounted to be used in a vehicle.

FIG. 14 illustrates a scanner 300 mounted in a vehicle 900 and used. When a distance between the surrounding object and the vehicle, and spatial data is transmitted to the vehicle, the vehicle assures a safety distance on the basis of received information in the present invention. For example, the vehicle may perform warning broadcast to a driver, or automatically control the speed of the vehicle.

The scanner in accordance with the above-described embodiments is not limited to the configurations and methods of the embodiments described above, but the entirety of or a part of the embodiments may be configured to be selectively combined such that various modifications of the embodiments can be implemented.

The invention claimed is:

1. A distance measurement device comprising:
 a first light transmitter configured, when active, to emit a first distance measurement beam to a measurement position on a surrounding object;
 a second light transmitter configured, when active, to emit a second distance measurement beam to the measurement position on the surrounding object;
 a light reception sensor configured to measure a position of a portion of the light reception sensor receiving light reflected by the surrounding object and collected at the distance measurement device;
 a central controller configured to selectively active one of the first light transmitter of the second light transmitter to emit one of the first distance measurement beam or the second distance measurement beam to the surrounding object,
 wherein the central controller is further configured to selectively activate another one of the first light transmitter or the second light transmitter to adjust a distance between one of a first light source lens included in the first light transmitter or a second light source lens included in the second light transmitter and a light reception lens included in the light reception sensor to adjust an angle of light incident to the light reception lens when the light reception sensor cannot measure the position of the light collected at the distance measurement device;
 a support plate to which the first light transmitter, the second light transmitter, and the light reception sensor are fixed;
 a tilt motor assembly configured to adjust a slope of the support plate;
 a rotation plate to which the support plate is fixed;
 a rotation motor assembly configured to adjust a rotation angle of the rotation unit; and
 a distance calculation processor configured to determine a distance between the distance measurement device and the measurement position based on the measured position.

2. The distance measurement device according to claim 1, wherein the first light source lens, the second light source lens, and the light reception lens are configured such that an angle made by the first or the second distance measurement beam and the light reflected at the measurement position and collected at the distance measurement device is in a range of about 0 to 20 degrees.

3. The distance measurement device according to claim 1, wherein the light reception sensor comprises a wavelength filter, and the wavelength filter passes only a wavelength corresponding to the first distance measurement beam and the second distance measurement beam.

4. The distance measurement device according to claim 1, wherein each of the first light transmitter and the second light transmitter comprises a light source emitting a corresponding one of the first distance measurement beam or the second distance measurement beam, and
 wherein the light source comprises a laser diode (LD) or a light emitting diode (LED).

5. The distance measurement device according to claim 1, wherein each of the first distance measurement beam and the second distance measuring beam is configured to be a parallel light or a convergent light by using a corresponding one of the first light source lens or the second light source lens.

6. The distance measurement device according to claim 1, further comprising:
 a rotation and tilt controller driving each of the tilt motor assembly and rotation motor assembly to respectively adjust the slope of the support plate and the rotation angle of the rotation plate to move the distance measurement position, and
 a spatial information operation processor to calculate a distance between the distance measurement device and the surrounding object based on the distance between the distance measurement device and the measurement position calculated by the distance calculation processor, the slope of the support plate, and the rotation angle of the rotation plate.

7. The distance measurement device according to claim 6, wherein the measurement position is moved on the surrounding object when one or more of the slope of the support plate or the rotation angle of the rotation plate is adjusted by the rotation and tilt controller.

8. The distance measurement device according to claim 6, further comprising an encoder that transmits to the spatial information operation processor an encoder signal identifying the slope of the support plate and the rotation angle of the rotation plate.

9. A method of operating a distance measurement device, the method comprising:
 emitting one of a first distance measurement beam by a first light transmitter or a second distance measurement beam by a second light transmitter to a measurement position on a surrounding object;
 determining, by a light reception sensor, whether a position at which light reflected from the measurement position and returned to the distance measurement device is focused can be measured;
 calculating, when the position can be measured, a distance between the distance measurement device and the measurement position based on the measured position;
 selectively activate another one of the first light transmitter or the second light transmitter to adjust a distance between a first light source lens included in the first light transmitter or a second light source lens included in the second light transmitter and a light reception lens included in the light reception sensor to adjust an angle of the light incident to the light reception lens when the light reception sensor cannot measure the position of the light collected at the distance measurement device; and adjusting a slope angle of a support plate and a rotation angle of a rotation plate to move the measurement position.

10. The method according to claim 9, further comprising making spatial information data by using the distance corresponding to the measurement position, the slope angle of the support angle and the rotation angle of the rotation unit.

* * * * *